United States Patent [19]

Besserman et al.

[11] Patent Number: 5,104,587

[45] Date of Patent: Apr. 14, 1992

[54] COUNTERCURRENT LIQUID/LIQUID EXTRACTION TO FRACTIONATE COMPLEX MIXTURES CONTAINING MEDIUM AND LONG CHAIN FATTY ACID TRIGLYCERIDES

[75] Inventors: Mark A. Besserman; Lowen R. Morrison, Jr.; Vicki L. Weber, all of Cincinnati, Ohio

[73] Assignee: The Procter & Gamble Company, Cincinnati, Ohio

[21] Appl. No.: 523,966

[22] Filed: May 16, 1990

[51] Int. Cl.$^5$ .............................................. C11B 3/00
[52] U.S. Cl. .................... 554/175; 554/206; 554/207
[58] Field of Search ............................ 260/428.5, 428

[56] References Cited

U.S. PATENT DOCUMENTS

| | | | |
|---|---|---|---|
| 2,200,390 | 5/1940 | Freeman | 260/412.4 |
| 2,200,391 | 5/1940 | Freeman | 260/412.4 |
| 2,239,692 | 4/1941 | Behr | 260/428 |
| 2,268,786 | 1/1942 | Van Dijck | 260/426 |
| 2,278,309 | 5/1942 | Freeman | 260/419 |
| 2,291,461 | 7/1942 | Freeman | 260/428 |
| 2,313,636 | 3/1943 | Freeman | 260/419 |
| 2,651,646 | 9/1953 | Goldsmith | 260/410.7 |
| 2,740,799 | 4/1956 | Young | 260/410.7 |
| 4,504,503 | 3/1985 | Biernoth et al. | 260/428.5 |

FOREIGN PATENT DOCUMENTS 269904 8/1988 European Pat. Off. .
322027 6/1989 European Pat. Off. .

OTHER PUBLICATIONS

Therrieault, J. Am. Oil. Chemist. Society, vol. 40, #9, pp. 395-399, 1963.
Feuge et al., "Modification of Vegetable Oils: Purification of Technical Monoglycerides," J. Am. Oil. Chem. Soc., vol. 27 (1950), pp. 117-122.
Rzhekhin et al., "Use of Liquid-Liquid Countercurrent Extraction for Separation of Cottonseed Oil Glycerides from Associated Products and Fractionating Them into Components," Maslob-Zhiv Prom, vol. 29 (1963), pp. 3-6.
Fish et al., "The application of Liquid/Liquid Extraction to the Fractionation of Cocount Oil" Oil & Soap (1945), pp. 217-219.
Mathias et al., "Phase Equilibria for Supercritical Extraction of Lemon Flavors and Palm Oils with Carbon Dioxide," fluid Phase Equilibria, vol. 29 (1986), pp. 545-554.
Gloyer et al., "Furans in Vegetable Oil Refining," Industrial and Chemical Engineering Chemistry, vol. 40 (1948), pp. 228-236.
Glover, "Fractionation of Drying Oils and Acids," J. Am. Oil Chem. Soc., vol. 27 (1950), pp. 462-467.
Goss, "Solvent Refining and Fractionation of Fats and Oils," J. Am. Oil Chem. Soc., vol. 26 (1949), pp. 584-588.

(List continued on next page.)

Primary Examiner—Jose G. Dees
Attorney, Agent, or Firm—Eric W. Guttag; Ronald L. Hemingway; Richard C. Witte

[57] ABSTRACT

Countercurrent liquid/liquid extraction processes for fractionating complex triglyceride mixtures to selectively remove "light" impurities (primarily MMM trglycerides) from MML/MLM triglycerides, or to selectively remove MML/MLM triglycerides from "heavy" impurities (primarily MLL/LML and LLL triglycerides), wherein M is a $C_6$-$C_{10}$ fatty acid residue or mixture thereof, and wherein L is a $C_{18}$-$C_{24}$ fatty acid residue or mixture thereof, are disclosed. In the case of "light" impurities, an oil stream containing MMM and MML/MLM triglycerides is passed countercurrently to a solvent stream containing a polar solvent or a supercritical fluid that is partially miscible with the oil stream to selectively remove the MMM triglycerides. In the case of "heavy" impurities, an oil stream containing MML/MLM, MLL/LML and LLL triglycerides is passed countercurrently to the solvent stream to selectively remove the MML/MLM triglycerides.

62 Claims, 2 Drawing Sheets

OTHER PUBLICATIONS

Young et al., "Acetone as a Selective Solvent for Vegetable Oils," J. Am. Oil Chem. Soc., vol. 32 (1955), pp. 397–400.

Martin, "Liquid/Liquid Extraction of Monoglycerides of Fatty Acids," Oleagineux, vol. 21 (1966), pp. 95–99.

Martin, "Application of Liquid-Liquid Extraction for Obtaining Fatty Acids Monoglycerides," Rev. Ferment. Ind. Aliment., vol. 20 (1965), pp. 131–143.

Martin, "Use of Liquid/Liquid Extraction for Production of Fatty Acid Monoglycerides," Rev Ferment, Ind. Aliment., vol. 20 (1965), pp. 169–179.

Martin, "Use of Liquid/Liquid Extraction for the Production of Fatty Acid Monoglycerides," Rev. Ferment. Ind. Aliment., vol. 20 (1965), pp. 206–220.

COUNTERCURRENT LIQUID/LIQUID EXTRACTION TO FRACTIONATE COMPLEX MIXTURES CONTAINING MEDIUM AND LONG CHAIN FATTY ACID TRIGLYCERIDES

TECHNICAL FIELD

This application relates to countercurrent liquid/liquid extraction to fractionate complex mixtures of medium and long chain fatty acid triglycerides. This application particularly relates to countercurrent liquid/liquid extraction to remove or separate out "light" and "heavy" impurities from such mixtures to provide preferred reduced calorie confectionery fats.

European patent application 322,027 to Seiden, published June 28, 1989, discloses reduced calorie fats comprising triglycerides having medium chain length ($C_6$–$C_{10}$) saturated fatty acid residues and long chain length (e.g., $C_{18}$–$C_{24}$) saturated fatty acid residues. These reduced calorie fats primarily comprise triglycerides selected from mono- long chain length MLM and MML triglycerides, and di- long chain length MLL and LML triglycerides, where M is a medium chain saturated fatty acid residue(s) and L is a long chain saturated fatty acid residue(s). These reduced calorie fats can be used as complete or partial replacements for other triglyceride fats to provide calorie reduction in various fat-containing food compositions such as salad oils, emulsified spreads, frozen desserts and the like.

For certain preferred reduced calorie fats, L is predominantly a long chain behenic fatty acid residue and M is typically a mixture of $C_8$ and $C_{10}$ saturated fatty acids. These preferred reduced calorie fats are useful as partial or complete replacements for confectionery fats, especially cocoa butter, particularly in chocolate-flavored products such as candy bars and enrobed chocolate-flavored products. To provide optimum mouthmelt properties for these preferred reduced calorie fats, the level of combined MML and MLM (mono-long chain) triglycerides is desirably maximized, e.g., to levels of about 90% or higher.

This European patent application 322,027 describes the synthesis of these reduced calorie fats by a wide variety of techniques. These techniques include: (a) random rearrangement of long chain triglycerides (e.g., tristearin or tribehenin) and medium chain triglycerides; (b) esterification of glycerol with a blend of the corresponding fatty acids; (c) transesterification of a blend of medium and long chain fatty acid methyl esters with glycerol; and (d) transesterification of long chain fatty acid glycerol esters (e.g., glyceryl behenate) with medium chain triglycerides. In particular, Example 1 of European patent application 322,027 discloses the synthesis of such reduced calorie fats by random rearrangement of tribehenin and commercial grade medium chain triglycerides using sodium methoxide as the catalyst at reaction temperatures of from 78° to 91° C. This catalyzed random rearrangement synthesis provides a complex mixture of MLM, MML, MLL, LML, MMM and LLL triglycerides, as well as the various mono- and diglycerides. (A similar, complex mixture of triglycerides is obtained when glycerol is esterified with a mixture of medium and long chain fatty acids, in the absence of an esterification catalyst, at temperatures of about 265° C.). Of this complex mixture, the particularly desirable MML/MLM triglycerides comprise, at most, only about 40 to about 45% of the total triglycerides. The remainder of this complex mixture comprises a significant quantity of what are referred to as "light" and "heavy" impurities. The "light" impurities primarily include MMM triglycerides, but can also include MM diglycerides, as well as medium and long chain saturated fatty acids. The "heavy" impurities are predominantly MLL/LML triglycerides, but can also include LLL triglycerides.

One of the techniques disclosed by European patent application 322,027 to purify this complex mixture is molecular distillation. Molecular distillation is capable of effectively removing MMM triglycerides, but cannot effectively remove mixed medium and long chain saturated fatty acid diglycerides. Molecular distillation can also remove MLL/LML triglycerides, but at the expense of subjecting the desired MML/MLM triglycerides to high temperatures that can potentially cause undesired rearrangement. In addition, molecular distillation operates as an essentially 1-stage separation, thus making it less efficient in removing "light" and "heavy" impurities from the desired MML/MLM triglycerides.

Other techniques disclosed in this European application for purifying this complex mixture are thermal and fractional crystallization. Thermal crystallization (without solvents) is capable of separating out mixed medium and long chain saturated fatty acid diglycerides (ML), as well as MLL/LML triglycerides, long chain saturated fatty acid diglycerides (LL) and long chain saturated fatty acids (L). Fractional crystallization (with solvents) can separate out the ML, MLL/LML, LL and L components in a first crystallization step, followed by a second crystallization step to separate out the desired MML/MLM triglycerides. However, thermal and solvent fractional crystallization typically decrease the yield of the desired MML/MLM triglycerides due to entrainment/co-crystallization. Also, "light" or "heavy" impurities present in the mixture at high concentrations (e.g., above about 10%) typically cannot be removed or separated out very satisfactorily by fractional crystallization. Furthermore, like molecular distillation, thermal and solvent fractional crystallization are essentially 1-stage separations that are again inefficient in removing or separating the "light" and "heavy" impurities from the desired MML/MLM triglycerides. Accordingly, it would be desirable to have a process which is capable of removing or separating out all of the undesired "light" or "heavy" impurities efficiently while achieving a high yield of the desired MML/MLM triglycerides.

BACKGROUND ART

A. Molecular Distillation and Fractional Crystallization to Remove Impurities from Mixture Containing Medium and Long Chain Fatty Acid Triglycerides European patent application 322,027 to Seiden, published June 28, 1989, discloses the preparation of a complex mixture of MML, MLM, LML, MLL, LLL and MMM triglycerides by random rearrangement of tribehenin and commercial grade medium chain triglycerides, as well as the resulting purification of this complex mixture by techniques such as molecular distillation and fractional crystallization.

B. Liquid/Liquid Extraction to Remove Impurities from Glyceride Mixtures

European Patent application 269.904 to Matsumoto et al. published June 8. 1988. discloses a process for refining fats, such as hard butters and cocoa butter-like fats obtained by enzymatically catalyzed transesterification of a medium-melting fraction of palm oil with stearic acid (see Example 1), to remove partial glycerides and/or free fatty acids. The free fatty acids can be removed by liquid/liquid extraction using solvents such as furfural, n-propyl alcohol, propionitrile, hexane, acetone, methanol and ethanol. This liquid/liquid extracted material is then subjected to fractional crystallization with acetone to remove the partial glycerides. This application makes a point that the liquid/liquid extraction and fractional crystallization do not cause a change in the triglyceride composition. See also Feuge et al, "Modification of Vegetable Oils: Purification of Technical Monoglycerides," *J. Am. Oil Chem. Soc.*, Vol. 27 (1950), pp. 117-22 (removal of residual glycerol from a mixture containing monoglycerides by extraction with hexane); U.S. Pat. No. 2,268,786 to Van Dijck, issued Jan. 6, 1942 (removal of undesirable constituents such as free fatty acids from fat/oils by adding a base such as ammonia to neutralize the free fatty acids and then removal of the soap by countercurrent extraction with a suitable solvent such as ethanol); Rzhekhin et al, "Use of Liquid-Liquid Countercurrent Extraction for Separation of Cottonseed Oil Glycerides from Associated Products and Fractionating Them into Components," *Maslob-Zhiv Prom.* Vol. 29 (1963), pp. 3-6 (liquid-liquid fractionation of cottonseed oil with ligroine/ethanol/water mixtures to remove nonglycerides from glycerides).

C. Liquid/Liquid Extraction of Coconut Oil with Ethanol

Fish et al, "The Application of Liquid/Liquid Extraction to the Fractionation of Coconut Oil", *Oil & Soap* (1945), pp. 217-19, discloses the use of liquid/liquid extraction to fractionate coconut oil into 32 fractions, including the final raffinate. The solvent used in this liquid/liquid extraction was 95% ethanol/water.

D. Solvent Extraction of Fats/Oils Using Supercritical Fluids

U.S. Pat. No. 4,504,503 to Biernoth et al. issued Mar. 12, 1985. discloses a process for producing a mixture of triglycerides having butter-like properties by extracting a fat such as butter oil or palm kernel stearin containing triglycerides having a carbon number ranging from 24 to 42 with a supercritical fluid, such as supercritical $CO_2$, to form: (1) a fraction enriched in triglycerides having said carbon numbers; and (2) a fraction enriched in triglycerides having carbon numbers higher than 42. This fractionation is apparently carried out as a single stage separation. See also Mathias et al, "Phase Equilibria for Supercritical Extraction of Lemon Flavors and Palm Oils with Carbon Dioxide," *Fluid Phase Equilibria.* Vol. 29 (1986), pp. 545-54, which discloses the extraction of palm oil with supercritical $CO_2$ to obtain a concentration of triglycerides in the middle range of carbon numbers,.e.g. 36.

E. Liquid/Liquid Extraction of Oils or Complex Lipid Mixtures with Multiple Solvent Systems that Contain Ethanol or Methanol U.S. Pat. No. 2.651.646 to Goldsmith. issued Sept. 8, 1953. discloses a method for increasing the level of monoglycerides in a mixture of glycerides by liquid/liquid extraction using a two-phase solvent system comprising an aqueous lower aliphatic alcohol (e.g., methanol or ethanol) and a hydrocarbon which is immiscible with the aqueous alcohol phase (e.g., hexane). See also Therriault, "Fractionation of Lipids by Countercurrent Distribution," *J. Am. Oil Chem. Soc.*, Vol. 40 (1963), pp. 394-99, which discloses countercurrent liquid/liquid extraction of a mixture of triglyceride, monoglyceride, cholesterol and stearic acid using a two-phase solvent system consisting of hexane, methanol, chloroform and water.

DISCLOSURE OF THE INVENTION

The present invention relates to countercurrent liquid/liquid extraction processes for fractionating complex triglyceride mixtures containing MML/MLM triglycerides, wherein M is a $C_6$–$C_{10}$ fatty acid residue or mixture thereof, and wherein L is a $C_{18}$–$C_{24}$ fatty acid residue or mixture thereof, to selectively remove or separate "light" impurities, "heavy" impurities, or both, from the MML/MLM triglycerides. In the case of "light" impurities, this liquid/liquid extraction process involves passing an oil stream containing at least about 2% MMM triglycerides and at least about 15% MML/MLM triglycerides countercurrently to a solvent stream containing a polar solvent or a supercritical fluid that is partially miscible with the oil stream in a manner such that the solvent stream selectively removes at least about 25% of the MMM triglycerides present in the oil stream. In the case of "heavy" impurities, this liquid/liquid extraction process involves passing an oil stream containing at least about 2% combined MLL/LML and LLL triglycerides and at least about 15% MML/MLM triglycerides countercurrently to a solvent stream containing a polar solvent or a supercritical fluid that is partially miscible with the oil stream in a manner such that the solvent stream selectively removes at least about 50% of the MML/MLM triglycerides present in the oil stream.

The countercurrent liquid/liquid extraction processes of the present invention provide a number of significant advantages over prior techniques, such as molecular distillation and thermal/solvent fractional crystallization, for fractionating complex triglyceride mixtures containing MML/MLM triglycerides to remove or separate out "light" and/or "heavy" impurities. Because of the lower temperatures used during countercurrent liquid/liquid extraction, undesired rearrangement of the MML/MLM triglycerides is avoided. In addition, the "light" and "heavy" impurities can be removed or separated more efficiently from the MML/MLM triglycerides without significantly decreasing the yield of these desired triglycerides.

DETAILED DESCRIPTION OF COUNTERCURRENT LIQUID/LIQUID EXTRACTION

A. Definitions

Figure 1:
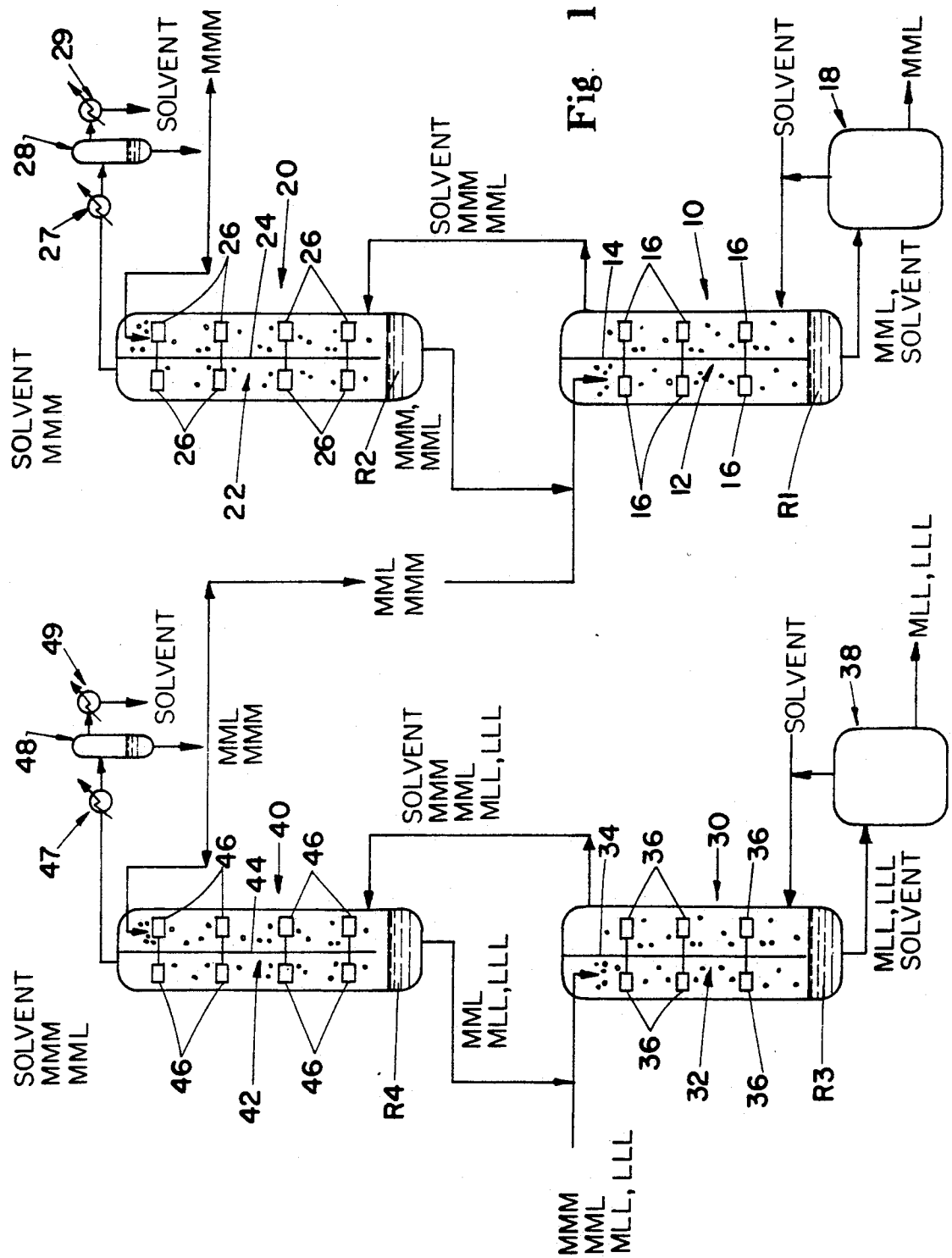
FIG. 1 shows a flow diagram of a preferred embodiment of countercurrent liquid/liquid extraction according to the present invention for removing or separating "light" and "heavy" impurities from MML/MLM triglycerides.

By "medium chain fatty acid," as used herein, is meant a saturated fatty acid, unsaturated fatty acid, or mixture thereof, having 6 to 10 carbon atoms.

By "medium chain saturated fatty acid," as used herein, is meant $C_6$ (caproic), $C_8$ (caprylic), or $C_{10}$ (capric) saturated fatty acids, or mixtures thereof. The $C_7$ and $C_9$ saturated fatty acids are not commonly found, but they are not excluded from the possible medium chain fatty acids. The present medium chain fatty acids do not include lauric acid ($C_{12}$), sometimes referred to in the art as a medium chain fatty acid.

By "long chain fatty acid," as used herein, is meant a saturated fatty acid, unsaturated fatty acid, or mixture thereof, having 18 to 24 carbon atoms.

By "long chain saturated fatty acid," as used herein, is meant $C_{18}$ (stearic), $C_{19}$ (nonadecylic), $C_{20}$ (arachidic), $C_{21}$ (heneicosanoic), $C_{22}$ (behenic), $C_{23}$ (tricosanoic), or $C_{24}$ (lignoceric) saturated fatty acids, or mixtures thereof.

By "MML," as used herein, is meant a triglyceride containing a long chain fatty acid residue in the #1 or #3 position (an end position) with two medium chain fatty acid residues in the remaining two positions, while "MLM" represents a triglyceride with a long chain fatty acid residue in the #2 position (the middle position) and two medium chain fatty acid residues in the #1 and #3 positions. Similarly, "MLL" represents a triglyceride with a medium chain fatty acid residue in the #1 or #3 position and two long chain fatty acid residues in the remaining two positions, "LML" represents a triglyceride with a medium chain fatty acid residue in the #2 position and two long chain fatty acid residues in the #1 and #3 positions, "MMM" represents a triglyceride containing medium chain fatty acid residues at all three positions, and "LLL" represents a triglyceride containing long chain fatty acid residues at all three positions.

By "MML/MLM triglycerides" is meant the combined level of MML and MLM triglycerides. Similarly, "MLL/LML triglycerides" means the combined level of MLL and LML triglycerides.

By "light impurities" is meant those components that generally have molecular weights lower than that of the MML/MLM triglycerides. These "light" impurities are primarily the MMM triglycerides, but can also include medium chain fatty acid diglycerides (MM), mixed medium and long chain fatty acid diglycerides (ML), as well as the medium (M) and long (L) chain fatty acid monoglycerides and fatty acids.

By "heavy impurities" is meant those components that generally have molecular weights higher than that of the MML/MLM triglycerides. These "heavy" impurities are predominantly the MLL/LML triglycerides, but can also include the LLL triglycerides and other high molecular weight impurities.

As used herein, the term "comprising" means various components or steps can be conjointly employed in the present invention. Accordingly, the term "comprising" encompasses the more restrictive terms "consisting essentially of" and "consisting of."

All percentages, ratios and proportions used herein are by weight unless otherwise specified.

B. Sources of Mixtures Containing MML/MLM Triglycerides

The countercurrent liquid/liquid extraction processes of the present invention can be used to purify a variety of complex triglyceride mixtures containing MML/MLM triglycerides. For example, the preparation of such mixtures is disclosed in European patent application 322,027 to Seiden, published June 28, 1989, which is incorporated by reference. Synthesis techniques that are disclosed in this European patent application include the following:

(a) random rearrangement of long chain fatty acid triglycerides (e.g. tristearin or tribehenin) and medium chain saturated fatty acid triglycerides;

(b) esterification of glycerol with a blend of the corresponding fatty acids;

(c) transesterification of a blend of medium and long chain fatty acid methyl esters with glycerol; and (d) transesterification of long chain fatty acid glycerol esters (e.g., glyceryl behenate) with medium chain triglycerides.

Random rearrangement of triglycerides is well-known in the art, as is the esterification of glycerol with fatty acids. For discussions on these subjects, see Hamilton et al., *Fats and Oils: Chemistry and Technology.* pp. 93-96, Applied Science Publishers Ltd., London (1980), and Swern, Bailey's Industrial Oil and Fat Products. 3d ed., pp. 941-943 and 958-965 (1964), both disclosures incorporated by reference herein. Transesterification is also discussed generally in Bailey's at pp. 958-963.

Fatty acids per se or naturally occurring fats and oils can serve as sources of fatty acids for preparing these triglyceride mixtures. In preparing mixtures containing MML/MLM triglycerides, wherein L is a long chain saturated fatty acid residue, the naturally occurring fats and oils are typically hydrogenated (hardened) to convert long chain unsaturated fatty acid residues to long chain saturated fatty acid residues. For example, completely or substantially completely hydrogenated (i.e., Iodine Value of about 10 or less) soybean oil and high erucic acid rapeseed oil are good sources of stearic and behenic acid, respectively. Odd chain length long chain fatty acids can be found in certain marine oils. Medium chain (saturated) fatty acids can be obtained from coconut, palm kernel, or babassu oils. They can also be obtained from commercial medium chain triglycerides, such as the Captex 300 brands sold by Capital City Products of Columbus, Ohio.

Tribehenin, useful for making these mixtures, can be made from behenic acid or from fractionated methyl behenate by esterification of the acid, or by transesterification of the methyl behenate with glycerol. More importantly, blends of behenic acid and medium chain fatty acids can be esterified with glycerol. Other long chain fatty acids ($C_{18}$, $C_{20}$, etc.) can be included. Similarly, methyl ester blends can be interesterified with glycerol.

The synthesis techniques disclosed in European patent application 322,027 provide fairly complex mixtures containing not only the desired MML/MLM triglycerides, but also significant quantities of "light" impurities (e.g., MMM triglycerides, as well as the various mono- and diglycerides), and "heavy" impurities (e.g., MLL/LML and LLL triglycerides). Indeed, of this complex mixture, the desirable MML/MLM triglycerides typically comprise, at most, only about 40 to about 45% of the total triglycerides. Other synthesis techniques can be employed to increase the level of desired MML/MLM triglycerides. One example of a process for obtaining higher levels of MML/MLM triglycerides is disclosed in U.S. application Serial No. 452,877 to Bernard W. Kluesener, Gordon K. Stipp and David K. Yang, filed Dec. 19, 1989, (P&G Case 4073), entitled "Selective Esterification of Long Chain Fatty Acid Monoglycerides with Medium Chain Fatty Acids," which is incorporated by reference. In this fatty acid esterification process, an at least about 60% pure $C_{18}$–$C_{24}$ fatty acid monoglyceride or mixture thereof is esterified with an at least about 90% pure $C_6$–$C_{10}$ fatty acid or mixture thereof at a temperature of from about 140° to about 250° C. in the substantial absence of an esterification catalyst. The mole ratio of fatty acid to monoglyceride used in this esterification is at least about 3:1. Water generated during this fatty acid esterification is also continuously removed.

Another process for obtaining higher levels of MML/MLM triglycerides is disclosed in copending U.S. application Ser. No. 452,923 to Gordon K. Stipp and Bernard W. Kluesener, filed Dec. 19, 1989 (P&G Case 4074), entitled "Selective Esterification of Long Chain Fatty Acid Monoglycerides with Medium Chain Fatty Acid Anhydrides," which is incorporated by reference. In this fatty acid anhydride esterification process, an at least about 60% pure $C_{18}$–$C_{24}$ fatty acid monoglyceride or mixture thereof is esterified with an at least about 50% pure $C_6$–$C_{10}$ fatty acid anhydride or mixture thereof at a temperature of from about 90° to about 190° C. in the substantial absence of an esterification catalyst. The mole ratio of fatty acid anhydride to monoglyceride used in this esterification is at least about 2:1.

The above processes involving esterification of monoglycerides with either fatty acids or fatty acid anhydrides are more selective in obtaining MML/MLM triglycerides. The Kluesener et al fatty acid esterification process can typically achieve MML/MLM triglyceride purities as high as from about 80 to about 96%, while the Stipp et al fatty acid anhydride esterification process can achieve MML/MLM triglyceride purities as high as from about 88 to about 98%. Even though these monoglyceride esterification processes are more selective in obtaining MML/MLM triglycerides, they can generate at least some "light" and/or "heavy" impurities. Accordingly, the countercurrent liquid/liquid extraction processes of the present invention can be useful in purifying the triglyceride mixtures obtained by these more selective esterification processes.

The countercurrent liquid/liquid extraction processes of the present invention are particularly useful in purifying complex triglyceride mixtures containing MML/MLM triglycerides, wherein M is a $C_8$ saturated fatty acid residue, a $C_{10}$ saturated fatty acid residue, or mixture thereof, and L is at least about 90% behenic fatty acid residues. Typically, the weight ratio of $C_8$ to $C_{10}$ saturated fatty acids is in the range of from about 30:70 to about 45:55. Purification of such complex mixtures according to the present invention can provide preferred reduced calorie confectionery fats.

C. Suitable Polar Solvents and Supercritical Fluids

A variety of solvents can be used in the solvent stream to carry out countercurrent liquid/liquid extraction according to the present invention. An important criteria for these solvents is that they be partially miscible with the oil stream. By "partially miscible" as used herein, is meant that, when the solvent and oil streams are mixed together, two distinct liquid phases result, one of the liquid phases being greater than about 50% solvent, the other liquid phase being greater than about 50% oil. In addition to being partially miscible, at least some of the oil stream components must be partially to fully soluble in the solvent.

Other important or preferred criteria for solvents used to carry out countercurrent liquid/liquid extraction according to the present invention are the following:

1. The density difference between the saturated liquid oil and solvent phases should be sufficiently great. This permits the liquid solvent and oil phases to be separated by gravity;

2. The solvent is not chemically reactive with the oil stream components. In other words, the solvent should be chemically stable and inert with regard to the oil stream components.

3. The distribution coefficient of the oil stream component to be removed or extracted by the solvent stream should be sufficiently large. The distribution coefficient (m) for a given component in a solvent can be represented by the following equation:

$$m = \frac{e}{r}$$

where e = concentration, at equilibrium, of the component in the solvent-rich phase (the extract phase); and r = concentration, at equilibrium, of the component in the oil-rich phase (the raffinate phase).

As the distribution coefficient of the component to be removed or extracted increases, the amount of solvent required for separation decreases, which is desirable in countercurrent liquid/liquid extraction according to the present invention.

4. The solvent must be selective for the component to be removed or extracted relative to the residual components present in oil stream. The selectivity of a particular solvent is determined by its separation factor (SF) which can be represented by the following equation:

$$SF = \frac{m_I}{m_p} = \frac{(I_e/I_r)}{(P_e/P_r)}$$

Where $m_I$ is the distribution coefficient for the component to be removed/extracted;

$m_p$ is the distribution coefficient for the residual components;

$I_e$ is the concentration of the component to be removed/extracted in the extract phase;

$I_r$ is the concentration of the component to be removed/extracted in the raffinate phase;

$P_e$ is the concentration of the residual components in the extract phase; and $P_r$ is the concentration of the residual components in the raffinate phase.

For countercurrent liquid/liquid extraction according to the present invention, the solvent must have a separation factor greater than 1, and preferably greater than about 2.

5. The solvent can be separated from the components dissolved in it. i.e. the solvent can be recovered. In other words, the solvent should not form an azeotrope with the components that are removed from the oil stream. Low latent heats of vaporization for the solvent are also desirable.

6. The interfacial tension between the solvent and oil phases should be relatively high. The higher the interfacial tension between the solvent and oil phases, the more readily will coalescence of any emulsions formed occur. Higher interfacial tensions will also make it more difficult to disperse one liquid phase in the other. However, in carrying out countercurrent liquid/liquid extraction according to the present invention, coalescence of the emulsions is usually more important.

7. The viscosity of the solvent should be sufficiently low to aid in coalescence and to provide ease of handling.

8. Since the purified MML/MLM triglycerides obtained are typically used in food products, it is preferable that the solvent be acceptable for contact with food or be food grade (i.e., FCC or USP grade).

Suitable partially miscible solvents fitting the above criteria can be selected from the following two categories: (1) polar solvents; and (2) supercritical fluids. Suitable polar solvents used in the present invention include methanol; mixtures of from about 80 to about 99% (preferably from about to about 98%) ethanol and from about 1 to about 20% (preferably from about 2 to about 8%) water; and mixtures of from about 5 to about 50% ethanol and from about 50 to about 95% methanol. For countercurrent liquid/liquid extraction involving the removal of "light" impurities, methanol and methanol-/ethanol mixtures are the preferred polar solvents. For countercurrent liquid/liquid extraction involving the separation of MML/MLM triglycerides from "heavy" impurities, ethanol/water mixtures and methanol/ethanol mixtures are the preferred polar solvents.

Instead of the above polar solvents, supercritical fluids can be used as the solvent stream to carry out countercurrent liquid/liquid extraction according to the present invention. Suitable supercritical fluids can be obtained by liquefication of gaseous $N_2O$, $SF_6$, $CF_3Cl$, $CF_2Cl$, $CH_2CF_2$, $C_3F_8$, $CHF_3$, ethane, propane, butane, ethylene, acetone, carbon dioxide or mixtures thereof which are unobjectionable from the point of view of health risk. Supercritical carbon dioxide (with or without some entrained polar solvent such as ethanol, methanol, or mixtures thereof) is a particularly preferred supercritical fluid for use in the present invention. The density and particularly the solvent characteristics of these supercritical fluids can be controlled by adjusting the temperature and particularly pressure of the supercritical fluid. While supercritical fluids can be used as the solvent stream to carry out countercurrent liquid/liquid extraction according to the present invention, the use of polar solvents is typically preferred.

D. Countercurrent Liquid/Liquid Extraction of Oil Stream with Solvent Stream

1. General Operation

The liquid/liquid extraction processes of the present invention are carried out by passing the oil stream countercurrently to the solvent stream in a manner such that the solvent stream selectively removes MMM triglycerides from the oil stream (in the case of "light" impurities), or MML/MLM triglycerides from the oil stream (in the case of "heavy" impurities). As used herein, the term "countercurrent" refers to a situation where the oil and solvent streams are caused to flow in opposite directions, and past or through one another, with relatively intimate contact (due to agitation or turbulence) such that the individual components present are more or less completely transferred to that stream (i.e. oil or solvent) in which they are more soluble as equilibrium is approached under the particular operating conditions. Countercurrent liquid/liquid extraction according to the present invention is typically characterized by the oil stream being dispersed as small droplets (estimated size in the range of from about 0.5 to about 3 mm.) in the solvent stream as the continuous phase, preferably without emulsion formation, phase inversion or flooding.

A particularly important operating condition in carrying out countercurrent liquid/liquid extraction according to the present invention is the temperature. Contact between the oil and solvent streams needs to be carried out at a temperature that is at or above the melting point of the components present in the oil stream, but without decomposing or degrading these components. In the case of polar solvents, the relative solubility of the oil components in the solvent stream typically increases as the temperature is increased. In the case of supercritical fluids, the relative solubility of the oil components in the solvent stream typically decreases as the temperature is increased. In other words, the temperature at which countercurrent liquid/liquid extraction is carried out with a supercritical fluid should be kept as low as possible to increase the solubility of the oil components in the solvent stream. Also, countercurrent liquid/liquid extraction needs to be carried out above the "critical temperature" of the supercritical fluid, e.g. above about 31.1° C. in the case of supercritical carbon dioxide. (The maximum temperature at which a gas can be liquefied is called the "critical temperature" and the pressure required to cause such liquefication at this temperature is called the "critical pressure"). In addition, the solubility of the oil components in the supercritical fluid typically increases with an increase in pressure. In other words, the pressure at which countercurrent liquid/liquid extraction is carried out with a supercritical fluid should be kept as high as possible to increase the solubility of the oil components in the solvent stream, provided the density difference between the saturated liquid oil and solvent phases is sufficiently great to allow separation by gravity.

With the above general guidelines in mind, countercurrent liquid/liquid extraction according to the present invention can be carried out as either a continuous or semicontinuous system. In the case of continuous systems, liquid/liquid extraction columns are typically used. In the case of semicontinuous systems, a series of mixer/settler tanks can be used. Preferably, countercurrent liquid/liquid extraction according to the present invention is carried out in a continuous system.

When polar solvents are used in the solvent stream, preferred extraction columns for carrying out continuous countercurrent liquid/liquid extraction include a variety of mechanically agitated type contacting devices. One group of suitable mechanically agitated contacting devices use a rotating shaft to which is attached a plurality of impellers to disperse and mix the liquids. Horizontal baffles (stator rings) are often included in such devices to reduce axial mixing. Examples of such devices include Oldshue-Rushton columns, Rotary Disc Contactors (RDC's), York-Scheibel columns and Kuhni columns. Another group of suitable mechanically agitated contacting devices use a perforated plate attached to a central shaft that is reciprocated up and down over a short distance to disperse and mix the liquids. An example of this device is the Karr column. Yet another group of suitable mechanically agitated contacting devices are pulsed columns. In this group of columns which contain packings or sieve trays, a rapid reciprocating motion of relatively short amplitude is applied to the liquids by a reciprocating plunger, piston pump or air pulse.

When supercritical fluids (e.g., supercritical carbon dioxide) are used in the solvent stream, packed columns can be used to carry out continuous countercurrent liquid/liquid extraction according to the present invention. Such packed columns are typically in the form of an elongated tower fitted with unstructured packings such as Pall rings, Raschig rings, or the like, or structured packings such as those available from Goodloe and Koch.

The solvent stream is usually less dense than the oil stream. Accordingly, in continuous countercurrent liquid/liquid extraction according to the present invention, the solvent stream is typically fed continuously into the lower portion of the extraction column, while the oil stream is fed at a higher point in the column. As the oil stream travels downwardly through the column, those oil phase components which are partially or fully soluble in the solvent will dissolve in the solvent stream traveling upwardly through the column. Conversely, those oil stream components which are not dissolved accumulate as an oil-rich phase (usually referred to as the "raffinate") that is typically continuously removed from the bottom portion of the extraction column. The solvent stream containing the dissolved components (usually referred to as the "extract") is typically continuously removed from the top of the extraction column.

In carrying out countercurrent liquid/liquid extraction according to the present invention, the particular operating conditions used depend upon three important considerations. The first is to maximize the removal of the component to be extracted from the oil stream. The operating conditions required to increase the removal or extraction of a particular component from the oil stream can be estimated by using a modified version of the Colburn Equation. See A. P. Colburn, *Trans. Amer. Inst. Chem. Engrs.*, Vol. 35 (1939), p. 211; C. J. King, *Separation Processes* (1971), p. 399. The Colburn Equation defines the relationship between the number of plug flow transfer units (stages of mass transfer) in the extraction column, the distribution coefficient of the component under consideration, the solvent:oil weight ratio used, and the fraction of the component remaining after extraction. If any 3 of the 4 variables are known, the Colburn Equation can be solved for the remaining variable. Since the fraction of the component remaining after extraction (f) is the desired unknown variable, the Colburn Equation can be represented as follows:

$$f = \frac{1 - U}{(e^{N(1-U)} - U)}$$

where
N = number of plug flow transfer units
$U = (mR)^{-1}$
mR = extraction factor
m = distribution coefficient
R = solvent:oil weight ratio If desired, the above equation can be graphically portrayed by plotting the fraction of the component remaining (f) versus the number of stages (N) at a constant extraction factor (mR) to obtain a curve; similar curves can be obtained at other extraction factors. Based on the Colburn Equation, there are basically three ways to increase the removal of a particular component; (1) increase the distribution coefficient for the component (e.g., by the use of higher temperatures or the use of a solvent in which the component is more soluble); (2) increase the solvent:oil weight ratio; or (3) increase the number of stages (e.g., by increasing the height of the extraction column).

The second important consideration is to minimize the solvent:oil weight ratio. Lower solvent:oil weight ratios are desired to minimize solvent recovery costs and to decrease the cross-sectional diameter required for the extraction column. For a given extraction column with a set number of stages available for mass transfer, the higher the distribution coefficient for the component to be extracted/removed, the lower will be the required solvent:oil ratio to obtain a desired degree of separation. This usually translates into the use of higher temperatures for polar solvents (or lower temperatures for supercritical fluids) and/or the use of solvents in which the component to be extracted is more soluble in carrying out countercurrent liquid/liquid extraction according to the present invention.

The third important consideration is to maximize the selectivity of the solvent for the component that is to be extracted/removed versus other components present in the oil stream. The selectivity of a particular solvent at a given solvent:oil weight ratio can be expressed as a ratio of the distribution coefficient for the component to be extracted/removed, relative to the distribution coefficient for the other components in the oil stream, i.e. the separation factor referred to in part C of this application. As noted in part C of this application, a suitably selective solvent must have a separation factor of greater than 1, and preferably greater than about 2.

Even though it is desirable that the solvent have a high degree of selectivity for the component to be extracted/removed, a significant amount of other components present in the oil stream can be extracted by the solvent stream during countercurrent liquid/liquid extraction. In order to recover these other components that are extracted by the solvent stream, the extract solvent stream is typically subjected to a rectification or "reflux" step. (A rectification step is particularly useful when less selective solvents are used in carrying out countercurrent liquid/liquid extraction.) At some point after the extract solvent stream leaves the extraction column, the solvent is typically separated from the extracted oil phase components. When a rectification step is used, a portion (from about 10 to about 90%, preferably from about 20 to about 75%) of the residual extracted oil phase components are returned or "refluxed." This "refluxed" oil stream is typically passed countercurrently to the extract solvent stream. The oil-rich raffinate phase that results provides components that can be combined with or added to the oil stream entering the extraction column. This rectification step can be carried out in a separate column, or, in an alternative embodiment, can be carried out by returning the "refluxed" oil stream to the top of the extraction column used for countercurrent liquid/liquid extraction. In this alternative embodiment, the oil stream to be subjected to countercurrent liquid/liquid extraction enters an intermediate point between the top and bottom of the extraction column.

2. To remove "light" impurities.

Within the above general operating conditions, the countercurrent liquid/liquid extraction process according to the present invention can be carried out to selectively remove "light" impurities, in particular at least about 25%, preferably at least about 50%, of the MMM triglycerides present in an oil stream containing MML/MLM (plus any MLL/LML and LLL) triglycerides. Oil streams suitable for processing according to the present invention to remove "light" impurities contain at least about 2% MMM triglycerides, and at least about 15% (usually at least about 30%) MML/MLM triglycerides. The particular level of MMM and MML/MLM triglycerides that are present in such oil streams will frequently depend on the manner in which the oil stream was obtained. For nonselective (random) synthesis methods, such as those disclosed in European patent application 322,027, the oil stream can comprise as low as about 30% (typically from about 35 to about 45%) MML/MLM triglycerides and as high as about 50% (typically from about 10 to about 40%) MMM triglycerides, after free fatty acids have been removed. In the case of selective synthesis methods, such as the esterification of long chain fatty acid monoglycerides with medium chain fatty acids or fatty acid anhydrides as disclosed in the Kluesener et al and Stipp et al applications, the oil stream can contain up to about 96% (typically from about 75 to about 96%) MML/MLM triglycerides, and as little as about 2% (typically from about 4 to about 10%) MMM triglycerides. (The particular level of MMM and MML/MLM triglycerides that are present can also depend on whether the oil stream has previously been subjected to other separation steps such as countercurrent liquid/liquid extraction, fractional crystallization or molecular distillation to remove or separate out "heavy" impurities.)

As previously noted in part C of this application, particularly suitable polar solvents for removing "light" impurities, in particular MMM triglycerides, are methanol and methanol/ethanol mixtures. When methanol is used as the solvent, suitable conditions for carrying out countercurrent liquid/liquid extraction in a continuous fashion are methanol:oil weight ratios of from about 1.5 to about 10, preferably from about 2 to about 6, with extraction temperatures of from about 120° to about 210° F. (from about 48.9° to about 98.9° C.), preferably from about 140° to about 190° F. (from about 60° to about 87.8° C.). When using methanol/ethanol mixtures as the solvent, continuous countercurrent liquid/liquid extraction can be carried out at solvent mixture:oil ratios of from about 1 to about 8, preferably from about 1.5 to about 4, and extraction temperatures of from about 120° to about 210° F. (from about 48.9° to about 98.9° C.), preferably from about 140° to about 190° F. (from about 60° to about 87.8° C.).

As previously noted in part C of this application, supercritical carbon dioxide is the preferred supercritical fluid for carrying out countercurrent liquid/liquid extraction according to the present invention. Suitable operating conditions for using supercritical carbon dioxide to remove MMM triglycerides from oil streams containing MML/MLM triglycerides are extraction pressures of from about 3000 to about 5000 psi, preferably from about 3500 to about 4500 psi, and carbon dioxide:oil weight ratios of from about 10 to about 150, preferably from about 20 to about 100.

If desired, ethanol/water mixtures can be used to remove MMM triglycerides from oil streams containing MML/MLM triglycerides. When ethanol/water mixtures are used as the solvent, suitable conditions for carrying out countercurrent liquid/liquid extraction in a continuous fashion are solvent mixture:oil weight ratios of from about 1 to about 10, preferably from about 1.5 to about 5, with extraction temperatures of from about 120° to about 220° F (from about 48.9° to about 104.4 C.), preferably from about 150° to about 200° F. (from about 65.6° to about 93.3° C.). However, ethanol/water mixtures are significantly less selective solvents than either methanol or methanol/ethanol mixtures in removing these "light" impurities, i.e. significant amounts of MML/MLM triglycerides are extracted as well. Accordingly, when using these less selective solvents, a rectification step is preferably employed to recover MML/MLM triglycerides that are extracted by the solvent stream along with the "light" impurities, and thus increase the "yield" of the MML/MLM triglycerides that are obtained from the oil stream.

3. To remove MML/MLM triglycerides from "heavy" impurities

Within the above general operating conditions, the countercurrent liquid/liquid extraction process according to the present invention can also be carried out to selectively remove at least about 50%, preferably at least about 75%, of the MML/MLM (plus any MMM) triglycerides present in an oil stream containing "heavy" impurities, in particular MLL/LML (plus any LLL) triglycerides. Oil streams suitable for processing according to the present invention involving "heavy" impurities contain at least about 2% combined MLL/LML and LLL triglycerides, and at least about 15% (usually at least about 30%) MML/MLM triglycerides. As in the case of "light" impurities, the particular level of MLL/LML, LLL and MML/MLM triglycerides that are present in such oil streams will frequently depend on the manner in which the oil stream was obtained. For nonselective (random) synthesis methods, such as those disclosed in European patent application 322,027, the oil stream can comprise as low as about 30% (typically from about 35 to about 45%) MML/MLM triglycerides, and as high as about 60% (typically from about 20 to about 45%) combined MLL/LML and LLL triglycerides, after free fatty acids have been removed. In the case of selective synthesis methods, such as the esterification of long chain fatty acid monoglycerides with medium chain fatty acids or fatty acid anhydrides as disclosed in the Kluesener et al and Stipp et al applications, the oil stream can contain up to about 96% (typically from about 75 to about 96%) MML/MLM triglycerides and as little as about 2% (typically from about 3 to about 8%) combined MLL/LML and LLL triglycerides. (The particular level of MLL/LML, LLL and MML/MLM triglycerides present can also depend on whether the oil stream has been subjected to other separation steps such as countercurrent liquid/liquid extraction, fractional crystallization or molecular distillation to remove "light" impurities.)

As previously noted in part C of this application, particularly suitable polar solvents for removing MML/MLM triglycerides from oil streams containing "heavy" impurities such as MLL/LML and LLL triglycerides are ethanol/water mixtures and methanol/ethanol mixtures. When ethanol/water mixtures are used as the solvent, suitable conditions for carrying out countercurrent liquid/liquid extraction in a continuous fashion are solvent mixture:oil weight ratios of from about 2 to about 15, preferably from about 2 to about 10, with extraction temperatures of from about 120° to about 220° F. (from about 48.9° to about 104.4° C.), preferably from about 150° to about 200° F (from about 65.6° to about 93.3° C.). When using methanol/ethanol mixtures as the solvent, continuous countercurrent liquid/liquid extraction can be carried out at solvent mixture:oil ratios of from about 1 to about 10, preferably from about 1.5 to about 5, and extraction temperatures of from 120° to about 220° F. (from about 48.9° to about 104.4° C.), preferably from about 150° to about 200° F. (from about 65.6° to about 93.3° C.).

As previously noted in part C of this application, supercritical carbon dioxide is the preferred supercritical fluid for carrying out countercurrent liquid/liquid extraction according to the present invention. Suitable operating conditions for using supercritical carbon dioxide to remove MML/MLM triglycerides from oil streams containing MLL/LML and LLL triglycerides are extraction pressures of from about 3000 to about 5000 psi, preferably from about 3500 to about 4500 psi, and carbon dioxide:oil weight ratios of from about 10 to about 150, preferably from about 50 to about 120.

In the case of countercurrent liquid/liquid extraction involving "heavy" impurities, the solvent streams and operating conditions used are typically less selective in removing MML/MLM triglycerides, i.e. significant amounts of MLL/LML and LLL triglycerides are extracted as well. Accordingly, a rectification step is preferably employed to remove MLL/LML and LLL triglycerides that are extracted by the solvent stream along with the MML/MLM triglycerides, and thus increase the "purity" of the MML/MLM triglycerides that are present in the extract solvent stream.

4. Detailed description of flow diagrams for preferred embodiments

A flow diagram of a preferred embodiment of counter-current liquid/liquid extraction according to the present invention for removing or separating both "light" and "heavy" impurities from the desired MML/MLM triglycerides is shown in FIG. 1. This embodiment uses solvent streams (represented as "solvent") containing polar solvents such as methanol, methanol/ethanol mixtures or ethanol/water mixtures or supercritical fluids such as supercritical carbon dioxide. The right-hand portion of FIG. 1 shows the removal of "light" impurities (represented as "MMM") from an oil stream containing MML/MLM triglycerides (represented as "MML"). The left-hand portion of FIG. 1 shows the removal of MML/MLM and MMM triglycerides from an oil stream containing "heavy" impurities (represented as "MLL" and "LLL"). Although FIG. 1 shows countercurrent liquid/liquid extraction of oil streams in a particular order (i.e. "heavy" impurities, followed by "light" impurities), this particular order can be reversed, if desired (i.e., "light" impurities, followed by "heavy" impurities). Also, each of the oil streams shown in FIG. 1 can be extracted with solvent streams containing the same solvent or different solvents, e.g., different polar solvents or a polar solvent and a supercritical fluid.

As shown in FIG. 1, this preferred embodiment involves the use of four liquid/liquid extraction columns identified as 10, 20, 30 and 40. Columns 10 and 30 are used to "extract" certain components from the oil stream, while columns 20 and 40 are used to "rectify" or recover certain components from the extract solvent stream. Each of these columns has a mechanical agitator identified as 12, 22, 32 or 42. Each of these agitators has a vertically rotating shaft identified as 14, 24, 34 or 44, to which are attached a plurality of paddles identified as 16, 26, 36 or 46. As each of these shafts rotate inside the column, the paddles attached thereto cause agitation and turbulence of the liquid components in the column, thereby effecting intimate contact between the solvent and oil phases. While columns 10, 20, 30 and 40 are shown as having vertically rotating agitators, suitable extraction columns can have vertically reciprocated agitators (e.g. Karr columns), or can be pulsed columns or packed columns.

As shown in the lower left-hand portion of FIG. 1 this preferred embodiment begins with an oil stream containing a mixture of MMM, MML, MLL and LLL triglycerides. This oil stream is fed to the top of column 30 while a solvent stream is fed to the lower portion of column 30. As the oil stream passes downwardly and countercurrently to the solvent stream, the two streams become intimately mixed (due to the agitation and turbulence caused by agitator 32) such that the MMM and MLM triglycerides in the oil stream are extracted by the solvent stream. As a result of this "extraction," an oil-rich raffinate phase identified as R3 accumulates at the bottom of column 30. This raffinate phase R3. which contains predominantly MLL and LLL triglycerides, plus some dissolved or entrained solvent, is continuously removed and is then fed to a stripper indicated by 38 in which the dissolved/entrained solvent is removed by evaporation, steam, or both. (When a supercritical fluid such as supercritical carbon dioxide is used, reducing the pressure at a temperature sufficiently high to maintain the fluidity of the raffinate phase, increasing the temperature, or both, is effective for removal.) The dissolved/ entrained solvent which is stripped out can be recycled to the solvent stream entering column 30, as shown in the lower left-hand portion of FIG. 1. The stripped raffinate phase exiting stripper 38, which contains predominantly MLL and LLL triglycerides, can be collected and recycled to a reactor (not shown) to generate additional quantities of the oil stream that is fed to column 30.

As also shown in the left-hand portion of FIG. 1, the solvent stream, which contains the extracted MMM and MML triglycerides (along with some MLL and LLL triglycerides), exits the top of column 30. This extract solvent stream is then fed to the bottom portion of extraction column 40, and passes upwardly and countercurrently to a "refluxed" oil stream (which contains predominantly MMM and MML triglycerides) entering the top of column 40. Agitator 42 causes an intimate mixing between the two streams such that the MLL and LLL triglycerides present in the extract solvent stream are extracted by the "refluxed" oil stream. As a result of this "rectification," an oil-rich raffinate phase identified as R4 accumulates at the bottom of column 40. This raffinate phase R4. which contains MLL and LLL triglycerides, plus MML triglycerides, continuously exits the bottom of column 40 and is then added back to the oil stream entering the top of column 30.

As shown in the upper left-hand portion of FIG. 1, this "rectified" extract solvent stream, which contains predominantly MMM and MML triglycerides, exits the top of column 40 and is then passed through a heat exchanger indicated by 47 to raise its temperature prior to entering an evaporator indicated by 48. In evaporator 48, the solvent is volatilized from the oil phase components and is condensed to liquid form by a cooler indicated by 49. (When a supercritical fluid such as supercritical carbon dioxide is used, reducing the pressure at a temperature sufficiently high to maintain the fluidity of the oil phase components, increasing the temperature, or both, is effective for removal.) The condensed solvent can then be recycled back (not shown) to the solvent stream entering column 30. The residual oil phase, which contains predominantly MML and MMM triglycerides, exits evaporator 48 and is then split into two portions. One of these portions is used to provide a "refluxed" oil stream which is returned and fed to the top of column 40 to remove MLL and LLL triglycerides from the extract solvent stream, as previously described. The second portion is collected and forms the oil stream that is fed to column 10.

As shown in the right-hand portion of FIG. 1, the oil stream formed by this second portion, which contains predominantly MML and MMM triglycerides, is fed to the top of column 10 and passes downwardly and countercurrently to a solvent stream that is fed to the bottom portion of column 10. As the two streams come into contact, they are intimately mixed (due to agitation and turbulence caused by agitator 12) such that the MMM triglycerides are extracted from the oil stream by the solvent stream. As a result of this "extraction," an oil-rich raffinate phase identified as R1 accumulates at the bottom of column 10. This raffinate phase R1, which contains predominantly MML triglycerides, plus some dissolved or entrained solvent, is continuously removed and then fed to a stripper indicated by 18 in which the dissolved/entrained solvent is removed. The dissolved-/entrained solvent which is stripped out can be recycled back to the solvent stream entering column 10, as shown in the lower right-hand portions of FIG. 1. The stripped raffinate phase exiting stripper 18 is collected and contains predominantly the desired MML triglycerides.

As also shown in the right-hand portion of FIG. 1, the solvent stream, which contains extracted MMM triglycerides (along with some MML triglycerides) is removed from the top of column 10. This extract solvent stream is then fed to the bottom portion of column 20 and passes upwardly and countercurrently to a "refluxed" oil stream (which contains predominantly MMM triglycerides) entering the top of column 20. Agitator 22 causes intimate mixing between the two streams such that the MML triglycerides present in the extract solvent stream are extracted by the "refluxed" oil stream. As a result of this "rectification," an oil-rich raffinate phase identified as R2 accumulates at the bottom of column 20. This raffinate phase which contains predominantly MML triglycerides (plus some MMM triglycerides), is continuously removed and then added back to the oil stream entering the top of column 10.

As shown in the upper right-hand portion of FIG. 1, this rectified extract solvent stream, which contains predominantly MMM triglycerides, exits the top of column 20 and is then passed through a heat exchanger identified as 27 to raise its temperature prior to entering an evaporator identified as 28. In evaporator 28, the solvent is volatilized from the oil phase components, is condensed to a liquid form by a cooler identified as 29 and can then be recycled back (not shown) to the solvent stream entering column 10. The residual oil phase, which contains predominantly MMM triglycerides, exits evaporator 28 and is divided into two portions. One portion can be collected and recycled to a reactor (not shown) to generate additional quantities of the oil stream entering column 30. The other portion is used to provide a "refluxed" oil stream which is returned and fed to the top of column 20 to remove MML triglycerides from the extract solvent stream, as previously described.

Figure 2:
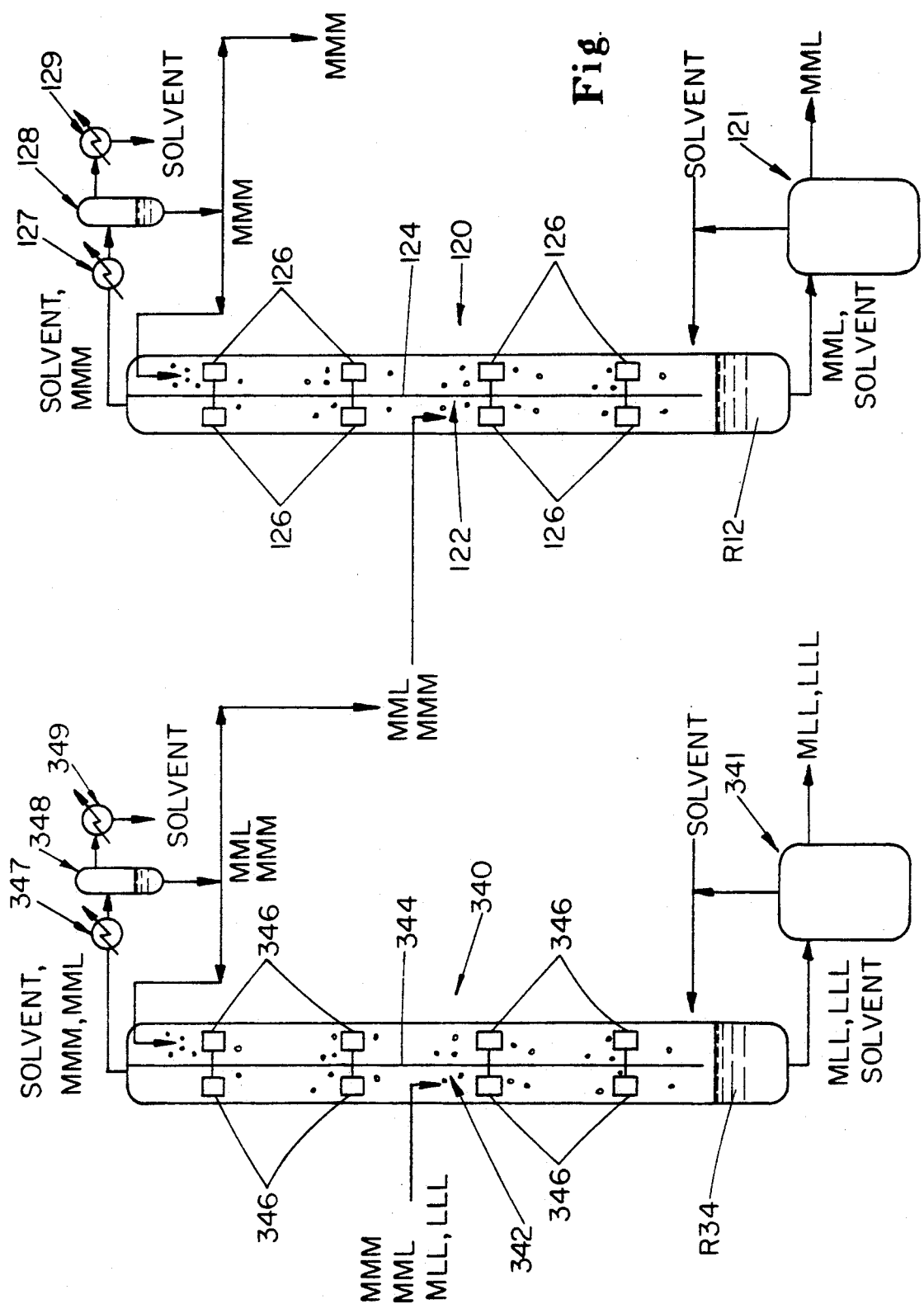
FIG. 2 shows a flow diagram of an alternative preferred embodiment of the countercurrent liquid/liquid extraction according to the present invention.

A flow diagram of an alternative preferred embodiment of countercurrent liquid/liquid extraction according to the present invention for removing or separating "light" and "heavy" impurities from the desired MML/MLM triglycerides is shown in FIG. 2. As with the embodiment shown in FIG. 1, the right-hand portion of FIG. 2 shows the removal of "MMM" triglycerides from an oil stream containing "MML" triglycerides, while the left-hand portion of FIG. 2 shows the removal of "MML" and "MMM" triglycerides from an oil stream containing "MLL" and "LLL" triglycerides. As in FIG. 1, the particular order of countercurrent liquid/liquid extraction shown (i.e. "heavy" impurities, followed by "light" impurities) can be reversed (i.e., "light" impurities, followed by "heavy" impurities), and can use solvent streams containing the same or different solvents.

As shown in FIG. 2, this alternative embodiment involves the use of two extraction columns identified as 120 and 340. Each of these extraction columns has a mechanical agitator identified as 122 or 342. Each of these agitators has a vertically rotating shaft identified as 124 or 344 to which are attached a plurality of paddles identified as 126 or 346. These agitators function the same as agitators 12, 22, 32 and 42 shown in FIG. 1 (i.e. they cause agitation and turbulence that intimately mixes the liquid oil and solvent phases in the column), and can be replaced with vertically reciprocating agitators, or with pulsed or packed columns, as previously described with respect to the embodiment shown in FIG. 1:

As shown in the left-hand portion of FIG. 2, this alternative embodiment begins with an oil stream containing a mixture of MMM, MML, MLL and LLL triglycerides. This oil stream is fed to column 340 at a point intermediate between the top and bottom thereof, while a solvent stream is fed to the lower portion of column 340. As the oil stream passes downwardly and countercurrently to the solvent stream, the two streams become intimately mixed (due to agitation and turbulence caused by agitator 342 such that the MMM and MLM triglycerides in the oil stream are extracted by the solvent stream. As a result of this "extraction," an oil-rich raffinate phase identified as R34 accumulates at the bottom of column 340. This raffinate phase R34. which contains predominantly MLL and LLL triglycerides, plus some dissolved/entrained solvent, is continuously removed and then fed to a stripper indicated by 341 in which the dissolved/entrained solvent is removed. The dissolved/entrained solvent which is stripped out can be recycled back to the solvent stream entering column 340, as shown in the lower left-hand portion of FIG. 2. The stripped raffinate phase exiting stripper 341 contains predominantly MLL and LLL triglycerides which can be collected and recycled to a reactor (not shown) to generate additional quantities of the oil stream that is fed to column 340.

As shown in the upper left-hand portion of FIG. 2, the solvent stream, which contains extracted MMM and MML triglycerides, exits the top of column 340 and is then passed through a heat exchanger indicated by 347 to raise its temperature prior to entering an evaporator indicated by 348. In evaporator 348, the solvent is volatilized from the oil phase components, is condensed to liquid form by a cooler indicated by 349, and can then recycled back (not shown) to the solvent stream entering column 340. The residual oil phase, which contains predominantly MML and MMM triglycerides, exits evaporator 348 and is divided into two portions. One portion is used to provide a "refluxed" oil stream which is returned and fed to the top of column 340. The other portion is collected and forms the oil stream that is fed to column 120.

In essence, column 340 shown in FIG. 2 performs the combined "extraction" and "rectification" steps of columns 30 and 40 shown in FIG. 1. Basically, the "extraction" step occurs in the lower portion of column 340 as the intermediately entering oil stream passes downwardly and countercurrently to the solvent stream entering the bottom portion of the column, while the "rectification" step occurs in the upper portion of column 340 as the extract solvent stream passes upwardly and countercurrently to the "refluxed" oil stream entering the top of the column.

As shown in the right-hand portion of FIG. 2, the oil stream formed by the second portion of the oil phase exiting evaporator 348, which contains predominantly MMM and MML triglycerides, is fed to column 120 at a point intermediate the top and bottom thereof and passes downwardly and countercurrently to a solvent stream that is fed to the bottom portion of the column. As the oil and solvent streams come into contact, they are intimately mixed (due to agitation and turbulence caused by agitator 122) such that the MMM triglycerides are extracted from the oil stream by the solvent stream. As a result of this "extraction," an oil-rich raffinate phase identified as R12 accumulates at the bottom of column 120. This raffinate phase R12, which contains predominantly MML triglycerides, plus some dissolved or entrained solvent, is continuously removed and then fed to a stripper identified by 121 in which the dissolved/entrained solvent is removed. The dissolved/entrained solvent which is stripped out can be recycled to the solvent stream entering column 120, as shown in the lower right-hand portion of FIG. 2. The stripped raffinate phase exiting stripper 121 is collected and contains predominantly the desired MML triglycerides.

As shown in the upper right-hand portion of FIG. 2, the solvent stream, which contains extracted MMM triglycerides, exits the top of column 120, and is then passed through a heat exchanger indicated by 127 to raise its temperature prior to entering an evaporator indicated by 128. In evaporator 128, the solvent is volatilized from the oil phase components, is condensed to liquid form by a cooler indicated by 129 and can then be recycled back (not shown) to the solvent stream entering column 120. The residual oil phase, which contains predominantly MMM triglycerides, exits evaporator 128 and is divided into two portions. One portion is collected and can be recycled to a reactor (not shown) to generate additional quantities of the oil stream entering column 340. The other portion is used to provide a "refluxed" oil stream which is returned and fed to the top of column 120.

In essence, column 120 shown in FIG. 2 performs the combined "extraction" and "rectification" steps of columns 10 and 20 shown in FIG. 1. Basically, the "extraction" step occurs in the lower portion of column 120 as the intermediately entering oil stream passes downwardly and countercurrently to the solvent stream entering the bottom portion of the column, while the "rectification" step occurs in the upper portion of column 120 as the extract solvent stream passes upwardly and countercurrently to the "refluxed" oil stream entering the top of the column.

E. Uses of MML/MLM Triglycerides as Reduced Calorie Fats

The MML/MLM triglycerides obtained according to the present invention (where L is a long chain saturated fatty acid residue and M is a medium chain saturated fatty acid residue) can be used as reduced calorie fats to partially or totally replace normal triglyceride fat in any fat-containing food composition comprising fat and nonfat ingredients to provide reduced calorie benefits. In order to obtain a significant reduction in calories, it is necessary that at least about 50% of the total fat in the food composition, or at least about 20% of the caloric value of the food, comprise the reduced calorie fat. On the other hand, very low calorie and thus highly desirable food compositions are obtained when the total fat comprises up to 100% of the reduced calorie fat, and up to about 50% of the calories.

The present reduced calorie fats are useful in a wide variety of food and beverage products. For example, the fats can be used in the production of baked goods in any form, such as mixes, shelf-stable baked goods, and frozen baked goods. Possible applications include, but are not limited to, cakes, brownies, muffins, bar cookies, wafers, biscuits, pastries, pies, pie crusts, and cookies, including sandwich cookies and chocolate chip cookies, particularly the storage-stable dual-textured cookies described in U.S. Pat. No. 4,455,333 of Hong & Brabbs. The baked goods can contain fruit, cream, or other fillings. Other baked good uses include breads and rolls, crackers, pretzels, pancakes, waffles, ice cream cones and cups, yeast-raised baked goods, pizzas and pizza crusts, baked farinaceous snack foods, and other baked salted snacks.

In addition to their uses in baked goods, the reduced calorie fats can be used alone or in combination with other regular calorie fats and oils to make shortening and oil products. Suitable sources of regular fats and oils include, but are not limited to: 1) vegetable fats and oils such as soybean, corn, sunflower, rapeseed, low erucic acid rapeseed, canola, cottonseed, olive, safflower, and sesame seed; 2) meat fats such as tallow or lard; 3) marine oils; 4) nut fats and oils such as coconut, palm, palm kernel, or peanut; 5) milkfat; 6) cocoa butter and cocoa butter substitutes such as shea, or illipe butter; and 7) synthetic fats. Shortening and oil products include, but are not limited to, shortenings, margarines, spreads, butter blends, lards, salad oils, popcorn oils, salad dressings, mayonnaise, and other edible oils.

Certain of the present reduced calorie fats are especially useful in flavored confectionery compositions, particularly chocolate-flavored confectionery compositions. See U.S. Pat. No. 4,888,196 to Ehrman et al, issued Dec. 19, 1989, which is incorporated by reference. These flavored confectionery compositions comprise:
a. a flavor enhancing amount of a flavor component;
b. from about 25 to about 45% of a fat component comprising:
  (1) at least about 70% of a reduced calorie fat having:
    (a) at least about 85% combined MLM and MML triglycerides;
    (b) no more than about 5% combined LLM and LML triglycerides;
    (c) no more than about 2% LLL triglycerides;
    (d) no more than about 4% MMM triglycerides;
    (e) no more than about 7% other triglycerides; wherein M is a $C_6$ to $C_{10}$ saturated fatty acid residue and L is a $C_{20}$ to $C_{24}$ saturated acid residue;
  (f) a fatty acid composition having:
    (i) from about 40 to about 60% combined $C_8$ and $C_{10}$ saturated fatty acids,
    (ii) a ratio of $C_8$ to $C_{10}$ saturated fatty acids of from about 1:2.5 to about 2.5:1,
    (iii) from about 40 to about 60% behenic fatty acid,
  (2) up to about 15% milkfat;
  (3) up to about 20% cocoa butter;
  (4) no more than about 4% diglycerides; and c. from about 55 to about 75% other nonfat confectionery ingredients.

These compositions are preferably tempered according to the process disclosed in said Ehrman et al application which comprises the following steps:
(I) forming a temperable flavored confectionery composition as defined above;
(II) rapidly cooling the composition of step (I) to a temperature of about 57° F. (13.9° C.)or less so that the reduced calorie fat forms a sub α phase;
(III) holding the cooled composition of step (II) at a temperature of about 57° F. (13.9° C.) or less for a period of time sufficient to form an effective amount of β-3 crystals from a portion of the sub α phase of the reduced calorie fat; and
(IV) after step (III), warming the cooled composition to a temperature in the range of from above about 57° to about 72° F. (about 13.9° to about 22.2° C.) in a manner such that: (a) the remaining portion of the reduced calorie fat transforms into a stable β-3 phase; and (b) the β-3 phase formed does not melt.

Certain of the present reduced calorie fats, like cocoa butter, can be crystallized into a stable β-3 phase. However, it has been found that the rate of crystallization of these reduced calorie fats into the β-3 phase is extremely slow under standard tempering conditions used with cocoa butter-based chocolate products. This rate is sufficiently slow so as to make cocoa butter-type tempering of flavored confectionery compositions containing these reduced calorie fats commercially unattractive.

Surprisingly, it has been found that tempering according to U.S. Pat. No. 4,888,196 provides a commercially attractive process that is simpler than even the standard tempering conditions used with cocoa butter-based chocolate products. In particular, this tempering process can be carried out during the normal warehousing and distribution of the flavored confectionery product. These desirable results are achieved by taking advantage of the ability of these reduced calorie fats to transform into the desired stable β-3 phase, via the less stable sub α phase. This transformation of the reduced calorie fats from the sub α phase to the stable β-3 phase according to this tempering process occurs without undesired bloom formation. The resulting tempered products also have the desired firmness and mouthmelt of cocoa butter-based chocolate products.

The present reduced calorie fats can also be fortified with vitamins and minerals, particularly the fat-soluble vitamins. U.S. Pat. No. 4,034,083 of Mattson (incorporated by reference herein) discloses polyol fatty acid polyesters fortified with fat-soluble vitamins. The fat-soluble vitamins include vitamin A, vitamin D, vitamin E, and vitamin K. Vitamin A is a fat-soluble alcohol of the formula $C_{20}H_{29}OH$. Natural vitamin A is usually found esterified with a fatty acid; metabolically active forms of vitamin A also include the corresponding aldehyde and acid. Vitamin D is a fat-soluble vitamin well known for use in the treatment and prevention of rickets and other skeletal disorders. Vitamin D comprises sterols, and there are at least 11 sterols with vitamin D-type activity. Vitamin E (tocopherol) is a third fat-soluble vitamin which can be used in the present invention. Four different tocopherols have been identified (alpha, beta, gamma and delta), all of which are oily, yellow liquids, insoluble in water but soluble in fats and oils. Vitamin K exists in at least three forms, all belonging to the group of chemical compounds known as quinones.

The naturally occurring fat-soluble vitamins are $K_1$ (phylloquinone), $K_2$ (menaquinone), and $K_3$ (menadione). The amount of the fat-soluble vitamins employed herein to fortify the present reduced calorie fat materials can vary. If desired, the reduced calorie fats can be fortified with a recommended daily allowance (RDA), or increment or multiple of an RDA, of any of the fat-soluble vitamins or combinations thereof.

Vitamins that are nonsoluble in fat can similarly be included in the present reduced calorie fats. Among these vitamins are the vitamin B complex vitamins, vitamin C, vitamin G, vitamin H, and vitamin P. The minerals include the wide variety of minerals known to be useful in the diet, such as calcium, magnesium, and zinc. Any combination of vitamins and minerals can be used in the present reduced calorie fat.

The present reduced calorie fats are particularly useful in combination with particular classes of food and beverage ingredients. For example, an extra calorie reduction benefit is achieved when the fat is used with noncaloric or reduced calorie sweeteners alone or in combination with bulking agents. Noncaloric or reduced calorie sweeteners include, but are not limited to, aspartame; saccharin; alitame, thaumatin; dihydrochalcones; cyclamates; steviosides; glycyrrhizins, synthetic alkoxy aromatics, such as Dulcin and P-4000; sucralose; suosan; miraculin; monellin; sorbitol, xylitol; talin; cyclohexylsulfamates; substituted imidazolines; synthetic sulfamic acids such as acesulfame, acesulfam-K and n-substituted sulfamic acids; oximes such as perilartine; rebaudioside-A; peptides such as aspartyl malonates and succanilic acids; dipeptides; amino acid based sweeteners such as gem-diaminoalkanes, meta-aminobenzoic acid, L-aminodicarboxylic acid alkanes, and amides of certain alphaaminodicarboxylic acids and gem-diamines; and 3-hydroxy-4-alkyloxyphenyl aliphatic carboxylates or heterocyclic aromatic carboxylates.

The reduced calorie fats can be used in combination with other noncaloric or reduced calorie fats, such as branched chain fatty acid triglycerides, triglycerol ethers, polycarboxylic acid esters, sucrose polyethers, neopentyl alcohol esters, silicone oils/siloxanes, and dicarboxylic acid esters. Other partial fat replacements useful in combination with the reduced calorie fats are medium chain triglycerides, highly esterified polyglycerol esters, acetin fats, plant sterol esters, polyoxyethylene esters, jojoba esters, mono/ diglycerides of fatty acids, and mono/ diglycerides of short-chain dibasic acids.

Certain of the present reduced calorie fats are particularly useful in reduced calorie fat compositions comprising certain substantially nonabsorbable, substantially nondigestible polyol polyesters. See U.S. application Ser. No. 329,629 to Paul Seiden, Corey J. Kenneally, Thomas J. Wehmeier, Mary M. Fox and Raymond L. Niehoff (P&G Case 3947), filed Mar. 28, 1989, which is incorporated by reference. These reduced calorie fat compositions comprise:

a. from about 10 to about 65% of an edible, substantially nonabsorbable, substantially nondigestible polyol fatty acid polyester having at least 4 fatty acid ester groups, wherein the polyol is selected from sugars and sugar alcohols containing from 4 to 8 hydroxy groups and wherein each fatty acid group has from 2 to 24 carbon atoms; and b. from about 35 to about 90% reduced calorie triglycerides selected from MMM, MLM, MML, LLM, LML and LLL triglycerides, and mixtures thereof;

wherein M is a saturated fatty acid residue selected from $C_6$ to $C_{10}$ saturated fatty acids, and mixtures thereof; wherein L is a saturated fatty acid residue selected from $C_{18}$ to $C_{24}$ saturated fatty acids, and mixtures thereof; wherein the reduced calorie triglycerides comprise: (1) at least about 85% combined MLM, MML, LLM and LML; and (2) up to about 15% combined MMM and LLL triglycerides, and wherein the fatty acid composition of the reduced calorie triglycerides comprises: (1) from about 10 to about 70% $C_6$ to $C_{10}$ saturated fatty acids; and (2) from about 30 to about 90% $C_{18}$ to $C_{24}$ saturated fatty acids.

Food products can comprise these reduced calorie fat compositions as the sole fat ingredient, or in combination with other fat ingredients such as triglyceride oils. These food products include frying oils for salted snacks and other fried foods, firm chocolate-flavored products such as chocolate-flavored candy bars or chips, as well as cooking and salad oils that are clear at room temperature, i.e., about 70° F. (21.1° C.), and preferably at lower temperatures, e.g., at about 50° F. (10° C.).

Surprisingly, certain of the present reduced calorie fats can function as anti-anal leakage agents for the polyol polyesters. In addition, the combination of the polyol polyesters with these reduced calorie fats provides significant advantages over the use of either component alone. The advantages provided by these combinations include: (1) increased caloric reduction; (2) textural/taste benefits (e.g., less waxiness/greasiness, improved mouthmelt); (3) less color degradation during frying; and (4) less high temperature volatility and foaming during frying.

Bulking or bodying agents are useful in combination with the reduced calorie fats in many food compositions. The bulking agents can be nondigestible carbohydrates, for example, polydextrose and cellulose or cellulose derivatives, such as carboxymethylcellulose, carboxyethylcellulose, hydroxypropylcellulose, methylcellulose and microcrystalline cellulose. Other suitable bulking agents include gums (hydrocolloids), starches, dextrins, fermented whey, tofu, maltodextrins, polyols, including sugar alcohols, e.g. sorbitol and mannitol, and carbohydrates, e.g. lactose.

Similarly, food and beverage compositions can be made that combine the present reduced calorie fats with dietary fibers to achieve the combined benefits of each. By "dietary fiber" is meant complex carbohydrates resistant to digestion by mammalian enzymes, such as the carbohydrates found in plant cell walls and seaweed, and those produced by microbial fermentation. Examples of these complex carbohydrates are brans, celluloses, hemicelluloses, pectins, gums and mucilages, seaweed extract, and biosynthetic gums. Sources of the cellulosic fiber include vegetables, fruits, seeds, cereals, and man-made fibers (for example, by bacterial synthesis). Commercial fibers such as purified plant cellulose, or cellulose flour, can also be used. Naturally occurring fibers include fiber from whole citrus peel, citrus albedo, sugar beets, citrus pulp and vesicle solids, apples, apricots, and watermelon rinds.

These dietary fibers may be in a crude or purified form. The dietary fiber used may be of a single type (e.g. cellulose), a composite dietary fiber (e.g. citrus albedo fiber containing cellulose and pectin), or some combination of fibers (e.g. cellulose and a gum). The fibers can be processed by methods known to the art.

The reduced calorie fats can also contain minor amounts of optional flavorings, emulsifiers, anti-spattering agents, anti-sticking agents, anti-oxidants, or the like.

Of course, judgment should be exercised to make use of appropriate reduced calorie fats and combinations of these fats with other food ingredients. For example, a combination of sweetener and fat would not be used where the specific benefits of the two are not desired. The fat and fat ingredient combinations are used where appropriate, and in the proper amounts.

Many benefits are obtained from the use of the present reduced calorie fats in food and beverage compositions, either when used alone or in combination with the ingredients discussed above. A primary benefit is the calorie reduction achieved when the fat is used as a total or partial fat replacement. This calorie reduction can be increased by using combinations of the present fats with reduced calorie sweeteners, bulking agents, or other reduced calorie or noncaloric fats. Another benefit which follows from this use is a decrease in the total amount of fats in the diet. Foods or beverages made with the reduced calorie fats instead of triglyceride fats will also contain less cholesterol, and the ingestion of these foods can lead to reduced serum cholesterol and thus reduced risk of heart disease.

A related benefit is that the use of the reduced calorie fats allows the production of foods and beverages that are stable in terms of shelf stability and penetration stability. Compositions made with the reduced calorie fats have acceptable organoleptic properties, particularly taste and texture.

Dietary foods can be made with the reduced calorie fats to meet special dietary needs, for example, of persons who are obese, diabetic, or hypercholesterolemic. The reduced calorie fat can be a major part of a low-fat, low-calorie, low-cholesterol diet, and they can be used alone or in combination with drug therapy or other therapy. Combinations of food or beverage products made with the reduced calorie fat can be used as part of a total dietary management regimen, based on one or more of these products, containing the reduced calorie fat alone or in combination with one or more of the above-mentioned ingredients, to provide one or more of the above-mentioned benefits.

This discussion of the reduced calorie fats uses, combinations, and benefits, is not intended to be limiting or all-inclusive. It is contemplated that other similar uses and benefits can be found that will fall within the spirit and scope of this invention.

F. Analytical Methods

Carbon Number Profile (CNP)

The carbon number profile (CNP) of the triglycerides (i.e. MML/MLM, MLL/LML, MMM and LLL) can be determined by programmed temperature-gas chromatography (GC) using a short fused silica column coated with methyl silicone for analysis and characterization of the composition by molecular weight. The glycerides are separated according to their respective carbon numbers, wherein the carbon number defines the total number of carbon atoms on the combined fatty acid residues. The carbon atoms on the glycerol molecule are not counted. Glycerides with the same carbon number will elute as the same peak. For example, a triglyceride composed of three $C_{16}$ (palmitic) fatty acid residues will co-elute with triglycerides made up of one $C_{14}$ (myristic), one $C_{16}$ and one $C_{18}$ (stearic) fatty acid residue or with a triglyceride composed of two $C_{14}$ fatty acid residues and one $C_{20}$ (arachidic) fatty acid residue.

Preparation of the fat sample for analysis is as follows: If the fat sample is solid, it is melted on a steam bath and stirred well to insure a representative sample. A 50.0 microliter portion of the sample is pipetted into a vial, and then 1.0 ml. of methylene chloride is added. The contents of the vial are shaken vigorously.

For determining the CNP of the prepared fat samples, a Hewlett-Packard 5890A series gas chromatograph equipped with temperature programming and a hydrogen flame ionization detector is used together with a Hewlett-Packard 3396A integrator. A 2 m. long, 0.22 mm. diameter fused silica capillary column coated with a thin layer of methyl silicone (J&W DBI) is also used. The column is heated in an oven where temperature can be controlled and increased according to a specified pattern by the temperature programmer. The hydrogen flame ionization detector is attached to the outlet port of the column. The signal generated by the detector is amplified by an electrometer into a working input signal for the integrator. The integrator prints out the gas chromatograph curve and electronically integrates the area under the curve. The following instrument conditions are used with the gas chromatograph:

| | |
|---|---|
| Septum purge | 2-3 ml./min. |
| Carrier flow ($H_2$) | 2 ml./min. |
| Vent flow | 300 ml./min. |
| Makeup carrier (He) | 20 ml./min. at 40 psi |
| Hydrogen | 15 ml./min. at 15 psi |
| Air | 400 ml./min. at 40 psi |

A 1.0 microliter portion of the prepared fat sample is taken by a gas-tight syringe and injected into the injection port of the gas chromatograph at an injection temperature of 350° C. The components are swept through the column by the hydrogen carrier gas. The column temperature is initially set at 80° C. and held at this temperature for 0.5 min. The column is then heated up to a final temperature of 350° C. at a rate of 20° C./min. The column is maintained at the final temperature of 350° C. for an additional 20 min.

The chromatographic peaks generated are then identified and the peak areas measured. Peak identification is accomplished by comparison to known pure glycerides previously analyzed. The peak area as determined by the integrator is used to calculate the percentage of glycerides having a particular Carbon Number ($C_N$) according to the following equation:

% $C_N$ = (Area of $C_N$/S) × 100 wherein S = sum of Area of $C_N$ for all peaks generated.

G. Specific Illustrations of Countercurrent Liquid/Liquid Extraction According to the Present Invention.

The following are specific illustrations of countercurrent liquid/liquid extraction, in accordance with the present invention:

EXAMPLE 1

Countercurrent liquid/liquid extraction was carried out to remove "light" impurities from an oil stream that was formulated to "simulate" a triglyceride mixture obtained by selective synthesis methods, i.e. the "simulated" oil stream was made up of triglyceride mixtures produced by other synthesis methods and then blended to approximate the composition of a mixture obtained by selective synthesis methods. A 3-inch (7.6 cm) diameter Oldshue-Rushton column (extraction height of 6 ft. (1.8 m.)) was used and was set up to provide 6.7 plug flow transfer units. Methanol was used as the extraction solvent. Other key operating conditions are shown in the following table:

| Condition | |
|---|---|
| Column temperature (°F.) | 145 |
| Solvent flow rate (#/Hr) | 27 |
| Oil flow rate (#/Hr) | 6.7 |
| Solvent:oil ratio | 4:1 |
| Rotor speed (rpm) | 250 |
| Reflux rate (#/Hr) | 0 |
| Reflux ratio | 0 |

The composition (solvent removed) of the oil stream feed, the resulting raffinate phase, the resulting extract phase, and the fraction of a particular component remaining in the raffinate phase are shown in the following table:

| Component* | | Feed (%) | Raffinate (%) | Extract (%) | Fraction Remaining |
|---|---|---|---|---|---|
| FA | (C8-C22) | 0.77 | 0.08 | 3.81 | 0.04 |
| MMM | (C24-C30) | 8.09 | 1.62 | 29.01 | 0.17 |
| ML | (C30-C32) | 1.05 | 0.42 | 3.44 | 0.26 |
| MML | (C36-C44) | 83.39 | 91.01 | 56.67 | 0.83 |
| MLL | (C46-C54) | 3.80 | 4.70 | 0.56 | 0.95 |
| Rate (#/Hr) | | 6.70 | 5.10 | 1.60 | |

*By CNP, "FA" = free fatty acid, "MML" = MML/MLM, "MLL" = MLL/LML

EXAMPLE 2

Countercurrent liquid/liquid extraction was carried out to remove "light" impurities from an oil stream obtained by a selective synthesis method. An Oldshue-Rushton extraction column like that described in Example 1 was used, but was set up to provide a 4.5 ft. (1.4 m.) "extraction" section and a 1.5 ft. (0.5 m.) "rectification" section. Methanol was used as the extraction solvent. The extract solvent stream was stripped of solvent and a portion of the residual oil phase components were used to provide a "refluxed" oil stream that was returned to the top of the extraction column. Other key operating conditions are shown in the following table:

| Condition | |
|---|---|
| Column temperature (°F.) | 145 |
| Solvent flow rate (#/Hr) | 27 |
| Oil flow rate (#/Hr) | 9 |
| Solvent:oil ratio | 3:1 |
| Rotor speed (rpm) | 230 |
| Reflux rate (#/Hr) | 1 |
| Reflux ratio | 0.5 |

The composition (solvent removed) of the oil stream feed, the resulting raffinate phase (before reflux), the resulting raffinate phase (after reflux), the resulting extract solvent phase (before reflux), and the resulting extract solvent phase (after reflux) are shown in the following table:

| Component* | | Feed (%) | Raffinate before Reflux (%) | Raffinate after Reflux (%) | Extract before Reflux (%) | Extract after Reflux (%) |
|---|---|---|---|---|---|---|
| FA | (C8-C22) | 6.80 | 0.00 | 0.10 | 27.51 | 39.41 |
| MMM | (C24-C30) | 7.59 | 1.24 | 1.82 | 13.73 | 13.65 |

| Component* | | Feed (%) | Raffinate before Reflux (%) | Raffinate after Reflux (%) | Extract before Reflux (%) | Extract after Reflux (%) |
|---|---|---|---|---|---|---|
| MML | (C36–C44) | 76.67 | 91.70 | 91.53 | 44.23 | 37.04 |
| MLL | (C46–C54) | 3.74 | 4.76 | 4.04 | 0.47 | 0.33 |

*By CNP, as in Example 1

EXAMPLE 3

Countercurrent liquid/liquid extraction was carried out to remove "light" impurities from a "simulated" oil stream as in Example 1 (i.e. methanol as the extraction solvent, Oldshue-Rushton column) but using a column (extraction) temperature of 175 F (79.4 C). Other key operating conditions are shown in the following table:

| Condition | |
|---|---|
| Solvent flow rate (#/Hr) | 22.5 |
| Oil flow rate (#/Hr) | 9 |
| Solvent:oil ratio | 2.5 |
| Rotor speed (rpm) | 185 |
| Reflux rate (#/Hr) | 0 |
| Reflux ratio | 0 |

The composition (solvent removed) of the oil stream feed, the resulting raffinate phase, the resulting extract solvent phase, and the fraction of a particular component remaining in the raffinate phase are shown in the following table:

| Component* | | Feed (%) | Raffinate (%) | Extract (%) | Fraction Remaining |
|---|---|---|---|---|---|
| FA | (C8–C22) | 1.10 | 0.11 | 5.96 | 0.08 |
| MMM | (C24–C30) | 8.43 | 2.00 | 29.04 | 0.17 |
| ML | (C30–C32) | 1.47 | 0.82 | 4.31 | 0.35 |
| MML | (C36–C44) | 80.49 | 87.91 | 51.21 | 0.83 |
| MLL | (C46–C54) | 3.77 | 4.67 | 0.60 | 0.95 |
| Rate (#/Hr) | | 9.00 | 6.80 | 2.20 | |

*By CNP, as in Example 1

EXAMPLE 4

Countercurrent liquid/liquid extraction was carried out to remove "light" impurities from a "simulated" oil stream in a 2-inch (5.1 cm) diameter Karr column (extraction height of 10 ft. (3m.)) that was set up to provide 7.0 plug flow transfer units. Methanol was used as the extraction solvent. Other key operating conditions are shown in the following table:

| Condition | |
|---|---|
| Column temperature (°F.) | 145 |
| Solvent flow rate (#/Hr) | 12 |
| Oil flow rate (#/Hr) | 3.7 |
| Solvent:oil ratio | 3.2:1 |
| Agitator speed (spm)* | 80 |
| Reflux rate (#/Hr) | 0 |
| Reflux ratio | 0 |

*Strokes (vertical) per minute

The composition (solvent removed) of the oil stream feed, the resulting raffinate phase, the resulting extract solvent phase and the fraction of a particular component remaining in the raffinate phase are shown in the following table:

| Component* | | Feed (%) | Raffinate (%) | Extract (%) | Fraction Remaining |
|---|---|---|---|---|---|
| FA | (C22) | 1.27 | 0.22 | 9.24 | 0.14 |
| MMM | (C24–C30) | 9.45 | 2.98 | 43.12 | 0.24 |
| ML | (C30–C32) | 1.42 | 0.76 | 3.84 | 0.48 |
| MML | (C36–C44) | 80.91 | 90.50 | 30.98 | 0.91 |
| MLL | (C46–C54) | 1.05 | 1.21 | 0.52 | 0.94 |
| Rate (#/Hr) | | 3.70 | 3.00 | 0.70 | |

*By CNP, as in Example 1

EXAMPLE 5

Countercurrent liquid/liquid extraction was carried out to remove "light" impurities from an oil stream obtained by a nonselective, random synthesis method using the Oldshue-Rushton extraction column described in Example 1. A 92.5% ethanol/7.5% water mixture was used as the extraction solvent. Other key operating conditions are shown in the following table:

| Condition | |
|---|---|
| Column temperature (°F.) | 160 |
| Solvent flow rate (#/Hr) | 27 |
| Oil flow rate (#/Hr) | 9.9 |
| Solvent:oil ratio | 2.7:1 |
| Rotor speed (rpm) | 140 |
| Reflux rate (#/Hr) | 0 |
| Reflux ratio | 0 |

The composition (solvent removed of the oil stream feed, the resulting raffinate phase, the resulting extract solvent phase, and the fraction of a particular component remaining in the raffinate phase are shown in the following table:

| Component* | | Feed (%) | Raffinate (%) | Extract (%) | Fraction Remaining |
|---|---|---|---|---|---|
| FA | (C8–C22) | 2.20 | 0.00 | 1.53 | 0.00 |
| MMM | (C24–C30) | 15.85 | 0.16 | 40.29 | 0.01 |
| MML | (C36–C44) | 39.65 | 35.03 | 45.16 | 0.51 |
| MLL | (C46–C54) | 32.48 | 50.33 | 11.19 | 0.87 |
| LLL | (C56–C68) | 7.97 | 13.64 | — | 0.99 |
| Rate (#/Hr) | | 9.9 | 5.7 | 4.2 | |

*By CNP, as in Example 1

EXAMPLE 6

Countercurrent liquid/liquid extraction was carried out to remove MML/MLM triglycerides from the raffinate phase obtained in Example 5. A 3-inch (7.6 cm) diameter elongated tower (extraction height 29.5 ft. (9 m.)) fitted with Goodloe structured packing was used. The column was set up to provide a 10.5 ft. (3.2 m.) "extraction" section and a 19.0 ft. (5.8 m.) "rectification" section. Supercritical carbon dioxide was used as the extraction solvent. After passing through the extraction column, the extract solvent stream was separated into a carbon dioxide phase and an oil phase. A portion of the residual oil phase components were used to provide a "refluxed" oil stream that was returned to the top of the extraction column. Other key operating conditions are shown in the following table:

| Condition | |
|---|---|
| Column pressure (psi) | 3600 |
| Column temperature (°F.) | 160 |
| Extract separation pressure (psi) | 250 |

-continued

| Condition | |
|---|---|
| Extract separation temperature (°F.) | 115 |
| Oil flow rate (#/Hr.) | 2.5 |
| CO$_2$:oil ratio | 96:1 |
| Reflux rate (#/Hr.) | 1.5 |
| Reflux ratio | 0.65 |

The composition (solvent removed) of the oil stream feed, the resulting raffinate phase, the resulting extract solvent phase, and the fraction of a particular component remaining in the raffinate phase are shown in the following table:

| Component* | | Feed (%) | Raffinate (%) | Extract (%) | Fraction Remaining |
|---|---|---|---|---|---|
| MMM | (C24–C30) | 0.16 | 0.00 | 1.01 | 0.00 |
| MML | (C36–C44) | 35.03 | 12.49 | 95.13 | 0.24 |
| MLL | (C46–C54) | 50.33 | 65.81 | 0.30 | 0.89 |
| LLL | (C56–C68) | 13.64 | 19.94 | 0.00 | 1.00 |
| Rate (#/Hr.) | | 2.5 | 1.7 | 0.8 | |

*By CNP, as in Example 1.

What is claimed is:

1. A countercurrent liquid/liquid extraction process for selectively removing MMM triglycerides from an oil stream containing MML/MLM triglycerides, wherein M is a $C_6$–$C_{10}$ fatty acid residue or mixture thereof and L is a $C_{18}$–$C_{24}$ fatty acid residue or mixture thereof, said process comprising the step of passing an oil stream containing at least about 2% MMM triglycerides and at least about 15% MML/MLM triglycerides countercurrently to a solvent stream containing a polar solvent or a supercritical fluid that is partially miscible with the oil stream in a manner such that the solvent stream selectively removes at least about 25% of the MMM triglycerides present in the oil stream.

2. The process of claim 1 wherein the oil stream comprises at least about 30% MML/MLM triglycerides and wherein M is a $C_6$–$C_{10}$ saturated fatty acid residue or mixture thereof, and L is a $C_{18}$–$C_{24}$ saturated fatty acid residue or mixture thereof.

3. The process of claim 2 wherein M is a $C_8$ saturated fatty acid residue, a $C_{10}$ saturated fatty acid residue, or mixture thereof, and L is at least about 90% behenic fatty acid residues.

4. The process of claim 2 wherein at least about 50% of the MMM triglycerides present in the oil stream are removed.

5. The process of claim 4 wherein the oil stream comprises from about 10 to about 40% MMM triglycerides and from about 35 to about 45% MML/MLM triglycerides.

6. The process of claim 4 wherein the oil stream is obtained by passing a second oil stream containing from about 20 to about 45% combined MLL/LML and LLL triglycerides and from about 35 to about 45% MML/MLM triglycerides countercurrently to a second solvent stream containing a polar solvent or a supercritical fluid that is partially miscible with the second oil stream in a manner such that the second solvent stream selectively removes at least about 50% of the combined MLL/LML and LLL triglycerides present in the second oil stream.

7. The process of claim 2 wherein the oil stream comprises from about 4 to about 10% MMM triglycerides and from about 75 to about 96% MML/MLM triglycerides.

8. The process of claim 2 which is carried out in a continuous fashion and wherein the solvent stream contains a polar solvent selected from the group consisting of methanol, mixtures of from about 80 to 99% ethanol and from about 1 to about 20% water, and mixtures of from about 5 to about 50% ethanol, and from about 50 to about 95% methanol.

9. The process of claim 8 wherein the solvent stream contains methanol and wherein the oil stream is passed countercurrently to the solvent stream at a methanol:oil weight ratio of from about 1.5 to about 10 and at an extraction temperature of from about 120° to about 210° F. (from about 48.9° to about 98.9° C.).

10. The process of claim 9 wherein the methanol:oil weight ratio is from about 2 to about 6 and wherein the extraction temperature is from about 140° to about 190° F (from about 60° to about 87.8° C.).

11. The process of claim 8 wherein the solvent stream contains a solvent mixture of from about 5 to about 50% ethanol and from about 50 to about 95% methanol and wherein the oil stream is passed countercurrently to the solvent stream at a solvent mixture:oil weight ratio of from about 1 to about 8 and at an extraction temperature of from about 120° to about 210° F. (from about 48.9° to about 98.9° C.).

12. The process of claim 2 which is carried out in a continuous fashion and wherein the solvent stream contains supercritical carbon dioxide.

13. The process of claim 12 wherein the oil stream is passed countercurrently to the solvent stream at a carbon dioxide:oil weight ratio of from about 10 to about 150 and at an extraction pressure of from about 3000 to about 5000 psi.

14. A countercurrent liquid/liquid extraction process for selectively removing MML/MLM triglycerides from an oil stream containing MLL/LML and LLL triglycerides, wherein M is a $C_6$–$C_{10}$ fatty acid residue or mixture thereof and L is a $C_{18}$–$C_{24}$ fatty acid residue or mixture thereof, said process comprising the step of passing an oil stream containing at least about 2% combined MLL/LML and LLL triglycerides and at least about 15% MML/MLM triglycerides countercurrently to a solvent stream containing a polar solvent or a supercritical fluid that is partially miscible with the oil stream in a manner such that the solvent stream selectively removes at least about 50% of the MML/MLM triglycerides present in the oil stream.

15. The process of claim 14 wherein the oil stream comprises at least about 30% MML/MLM triglycerides and wherein M is a $C_6$–$C_{10}$ saturated fatty acid residue or mixture thereof, and L is a $C_{18}$–$C_{24}$ saturated fatty acid residue or mixture thereof.

16. The process of claim 15 wherein M is a $C_8$ saturated fatty acid residue, a CIO saturated fatty acid residue, or mixture thereof, and L is at least about 90% behenic fatty acid residues.

17. The process of claim 15 wherein at least about 75% of the MML/MLM triglycerides present in the oil stream are removed.

18. The process of claim 17 wherein the oil stream comprises from about 20 to about 45% combined MLL/LML and LLL triglycerides and from about 35 to about 45% MML/MLM triglycerides.

19. The process of claim 17 wherein the oil stream is obtained by passing a second oil stream containing from about 10 to about 40% MMM triglycerides and from about 35 to about 45% MML/MLM triglycerides countercurrently to a second solvent stream containing a polar solvent or a supercritical fluid that is partially miscible with the second oil stream in a manner such that the second solvent stream selectively removes at least about 25% of the MMM triglycerides present in the second oil stream.

20. The process of claim 15 wherein the oil stream comprises from about 3 to about 8% combined MLL/LML and LLL triglycerides and from about 80 to about 96% MML/MLM triglycerides.

21. The process of claim 15 which is carried out in a continuous fashion and wherein the solvent stream contains a polar solvent selected from the group consisting of methanol, mixtures of from about 80 to 99% ethanol and from about 1 to about 20% water, and mixtures of from about 5 to about 50% ethanol, and from about 50 to about 95% methanol.

22. The process of claim 21 wherein the solvent stream contains a solvent mixture of from about 92 to about 98% ethanol and from about 2 to about 8% water and wherein the oil stream is passed countercurrently to the solvent stream at a solvent mixture:oil weight ratio of from about 2 to about 15 and at an extraction temperature of from about 120° to about 220° F. (from about 48.9° to about 104.4° C.).

23. The process of claim 22 wherein the solvent mixture:oil weight ratio is from about 2 to about 10 and wherein the extraction temperature is from about 150° to about 200° F. (from about 65.6° C. to about 93.3° C).

24. The process of claim 21 wherein the solvent stream contains a solvent mixture of from about 5 to about 50% ethanol and from about 50 to about 95% methanol and wherein the oil stream is passed countercurrently to the solvent stream at a solvent mixture:oil weight ratio of from about 1 to about 10 and at an extraction temperature of from about 120° to about 220° F. (from about 48.9° to about 104.4° C.).

25. The process of claim 15 which is carried out in a continuous fashion and wherein the solvent stream contains supercritical carbon dioxide.

26. The process of claim 25 wherein the solvent stream contains supercritical carbon dioxide and wherein the oil stream is passed countercurrently to the solvent stream at a carbon dioxide:oil weight ratio of from about 10 to about 150 and at an extraction pressure of from about 3000 to about 5000 psi.

27. The process of claim 26 wherein the carbon dioxide:oil weight ratio is from about 50 to about 120 and wherein the extraction pressure is from about 3500 to about 4500 psi.

28. A continuous countercurrent liquid/liquid extraction process for selectively removing MMM triglycerides from an oil stream containing MML/MLM triglycerides, wherein M is a $C_6$–$C_{10}$ fatty acid residue or mixture thereof and L is a $C_{18}$–$C_{24}$ fatty acid residue or mixture thereof, said process comprising the steps of:
  (a) passing an oil stream containing at least about 2% MMM triglycerides and at least about 30% MML/MLM triglycerides countercurrently to a solvent stream containing a polar solvent or a supercritical fluid that is partially miscible with the oil stream in a manner such that the solvent stream selectively removes at least about 25% of the MMM triglycerides present in the oil stream, to form an extract solvent stream containing the removed MMM triglycerides and at least some MML/MLM triglycerides, and a raffinate phase containing the residual MML/MLM triglycerides;
  (b) passing the extract solvent stream countercurrently to a refluxed oil stream containing MMM triglycerides in a manner such that the refluxed oil stream removes MML/MLM triglycerides present in the extract solvent stream, to form a rectified extract solvent stream;
  (c) removing the solvent from the rectified extract solvent stream to form a residual oil phase containing MMM triglycerides;
  (d) using a portion of the residual oil phase to provide the refluxed oil stream of step (b); and
  (e) collecting the remaining portion of the residual oil phase.

29. The process of claim 28 wherein step (b) also forms a second raffinate phase containing MMM and MML/MLM triglycerides and which comprises the further step (f) of adding the second raffinate phase to the oil stream of step (a).

30. The process of claim 28 wherein steps (a) and (b) are carried out in the same extraction column.

31. The process of claim 28 wherein the refluxed oil stream comprises from about 10 to about 90% of the residual oil phase of step (d).

32. The process of claim 31 wherein the refluxed oil stream comprises from about 25 to about 75% of the residual oil phase of step (d).

33. The process of claim 28 wherein M is a $C_6$–$C_{10}$ saturated fatty acid residue or mixture thereof, and L is a $C_{10}$–$C_{24}$ saturated fatty acid residue or mixture thereof.

34. The process of claim 33 wherein M is a $C_8$ saturated fatty acid residue, a $C_{10}$ saturated fatty acid residue, or mixture thereof, and L is at least about 90% behenic fatty acid residues.

35. The process of claim: 32 wherein at least about 50% of the MMM triglycerides present in the oil stream are removed.

36. The process of claim 35 wherein the oil stream comprises from about 10 to about 40% MMM triglycerides and from about 35 to about 45% MML/MLM triglycerides.

37. The process of claim 33 wherein the oil stream is obtained by passing a second oil stream containing from about 20 to about 45% combined MLL/LML and LLL triglycerides and from about 35 to about 45% MML/MLM triglycerides countercurrently to a second solvent stream containing a polar solvent or a supercritical fluid that is partially miscible with the second oil stream in a manner such that the second solvent stream selectively removes at least about 50% of the combined MLL/LML and LLL triglycerides present in the second oil stream.

38. The process of claim 33 wherein the oil stream comprises from about 4 to about 10% MMM triglycerides and from about 75 to about 96% MML/MLM triglycerides.

39. The process of claim 33 which is carried out in a continuous fashion and wherein the solvent stream contains a polar solvent selected from the group consisting of methanol, mixtures of from about 80 to 99% ethanol and from about 1 to about 20% water, and mixtures of from about 5 to about 50% ethanol, and from about 50 to about 95% methanol.

40. The process of claim 39 wherein the solvent stream contains methanol and wherein the oil stream is passed countercurrently to the solvent stream at a methanol:oil weight ratio of from about 1.5 to about 10 and at an extraction temperature of from about 120° to about 210° F. (from about 48.9° to about 98.9° C.).

41. The process to claim 40 wherein the methanol:oil weight ratio is from about 2 to about 6 and wherein the extraction temperature is from about 140° to about 190° F. (from about 60° to aobut 87.8° C.).

42. The process of claim 39 wherein the solvent stream contains a solvent mixture of from about 5 to about 50% ethanol and from about 50 to about 95% methanol and wherein the oil stream is passed countercurrently to the solvent stream at a solvent mixture:oil weight ratio of from about 1 to about 8 and at an extraction temperature of from about 120 to about 210° F. (from about 48.9° to about 98.9° C.).

43. The process of claim 33 which is carried out in a continuous fashion and wherein the solvent stream contains supercritical carbon dioxide.

44. The process of claim 43 wherein the oil stream is passed countercurrently to the solvent stream at a carbon dioxide:oil weight ratio of from about 10 to about 150 and at an extraction pressure of from about 3000 to about 5000 psi.

45. A continuous countercurrent liquid/liquid extraction process for selectively removing MML/MLM and MMM triglycerides from an oil stream containing MLL/LML and LLL triglycerides, wherein M is a $C_6$-$C_{10}$ fatty acid residue or mixture thereof and L is a $C_{18}$-$C_{24}$ fatty acid residue or mixture thereof, said process comprising the steps of:

(a) passing an oil stream containing at least about 2% combined MLL/LML and LLL triglycerides and at least about 30% combined MML/MLM and MMM triglycerides countercurrently to a solvent stream containing a polar solvent or a supercritical fluid that is partially miscible with the oil stream in a manner such that the solvent stream selectively removes at least about 50% of the MML/MLM and MMM triglycerides present in the oil stream, to form an extract solvent stream containing the removed MMM and MML/MLM triglycerides and at least some MLL/LML and LLL triglycerides, and a raffinate phase containing the residual MLL/LML and LLL triglycerides;

(b) passing the extract solvent stream countercurrently to a refluxed oil stream containing MML/MLM and MMM triglycerides in a manner such that the refluxed oil stream removes MLL/LML and LLL triglycerides present in the extract solvent stream, to form a rectified extract solvent stream;

(c) removing the solvent from the rectified extract solvent stream to form a residual oil phase containing MML/MLM and MMM triglycerides;

(d) using a portion of the residual oil phase to provide the refluxed oil stream of step (b); and (e) collecting the remaining portion of the residual oil phase.

46. The process of claim 45 wherein step (b) also forms a second raffinate phase containing MLL/LML, LLL and MML/MLM triglycerides and which comprises the further step (f) of adding the second raffinate phase to the oil stream of step (a).

47. The process of claim 45 wherein steps (a) and (b) are carried out in the same extraction column.

48. The process of claim 45 wherein the refluxed oil stream comprises from about 10 to about 90% of the residual oil phase of step (d).

49. The process of claim 48 wherein the refluxed oil stream comprises from about 25 to about 75% of the residual oil phase of step (d).

50. The process of claim 45 wherein M is a $C_6$-$C_{10}$ saturated fatty acid residue or mixture thereof, and L is a $C_{18}$-$C_{24}$ saturated fatty acid residue or mixture thereof.

51. The process of claim 50 wherein M is a $C_8$ saturated fatty acid residue, a $C_{10}$ saturated fatty acid residue, or mixture thereof, and L is at least about 90% behenic fatty acid residues.

52. The process of claim 50 wherein at least about 75% of the MML/MLM and MMM triglycerides present in the oil stream are removed.

53. The process of claim 50 wherein the oil stream comprises from about 20 to about 45% combined MLL/LML and LLL triglycerides and from about 35 to about 45% MML/MLM triglycerides.

54. The process of claim 50 wherein the oil stream is obtained by passing a second oil stream containing from about 10 to about 40% MMM triglycerides and from about 35 to about 45% MML/MLM triglycerides countercurrently to a second solvent stream containing a polar solvent or a supercritical fluid that is partially miscible with the second oil stream in a manner such that the second solvent stream selectively removes at least about 25% of the MMM triglycerides present in the second oil stream.

55. The process of claim 50 wherein the oil stream comprises from about 3 to about 8% combined MLL/LML and LLL triglycerides and from about 80 to about 96% MML/MLM triglycerides.

56. The process of claim 50 which is carried out in a continuous fashion and wherein the solvent stream contains a polar solvent selected from the group consisting of methanol, mixtures of from about 80 to 99% ethanol and from about 1 to about 20% water, and mixtures of from about 5 to about 50% ethanol, and from about 50 to about 95% methanol.

57. The process of claim 56 wherein the solvent stream contains a solvent mixture of from about 92 to about 98% ethanol and from about 2 to about 8% water and wherein the oil stream is passed countercurrently to the solvent stream at a solvent mixture:oil weight ratio of from about 2 to about 15 and at an extraction temperature of from about 120° to about 220° F. (from about 48.9° to about 104.4° C.).

58. The process of claim 57 wherein the solvent mixture:oil weight ratio is from about 2 to about 10 and wherein the extraction temperature is from about 150° to about 200° F. (from about 65.6° C. to about 93.3° C.).

59. The process of claim 56 wherein the solvent stream contains a solvent mixture of from about 5 to about 50% ethanol and from about 50 to about 95% methanol and wherein the oil stream is passed countercurrently to the solvent stream at a solvent mixture:oil weight ratio of from about 1 to about 10 and at an extraction temperature of from about 120° to about 220° F. (from about 48.9° to about 104.4° C.).

60. The process of claim 50 which is carried out in a continuous fashion and wherein the solvent stream contains supercritical carbon dioxide.

61. The process of claim 60 wherein the oil stream is passed countercurrently to the solvent stream at a carbon dioxide:oil weight ratio of from about 10 to about 150 and at an extraction pressure of from about 3000 to about 5000 psi.

62. The process of claim 61 wherein the carbon dioxide:oil weight ratio is from about 50 to about 120 and wherein the extraction pressure is from about 3500 to about 4500 psi.

* * * * *

UNITED STATES PATENT AND TRADEMARK OFFICE
CERTIFICATE OF CORRECTION

PATENT NO. : 5,104,587
DATED : April 14, 1992
INVENTOR(S) : Mark A. Besserman et al.

It is certified that error appears in the above-identified patent and that said Letters Patent is hereby corrected as shown below:

In Abstract - "trglycerides" should be --triglycerides--

Col. 7, line 15, "esterifidation" should be --esterification--

Col. 17, line 39, after the words "This raffinate phase", insert --R2--

Col. 30, line 56, "CIO" should be $C_{10}$--

Col. 32, line 31, "$C_{10}-C_{24}$" should be --$C_{18}-C_{24}$--

Signed and Sealed this

Sixteenth Day of November, 1993

Attest:

BRUCE LEHMAN

*Attesting Officer*

*Commissioner of Patents and Trademarks*